US009679488B2

(12) United States Patent
Matsumoto

(10) Patent No.: US 9,679,488 B2
(45) Date of Patent: Jun. 13, 2017

(54) DRIVE ASSISTANCE APPARATUS

(71) Applicant: TOYOTA JIDOSHA KABUSHIKI KAISHA, Toyota-shi, Aichi (JP)

(72) Inventor: Kentaro Matsumoto, Yokohama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/012,191

(22) Filed: Feb. 1, 2016

(65) Prior Publication Data

US 2016/0225261 A1 Aug. 4, 2016

(30) Foreign Application Priority Data

Feb. 2, 2015 (JP) ................................ 2015-018762

(51) Int. Cl.
*G08G 1/16* (2006.01)
*B60W 50/08* (2012.01)

(52) U.S. Cl.
CPC ............ *G08G 1/167* (2013.01); *B60W 50/08* (2013.01); *B60W 2520/12* (2013.01); *B60W 2720/24* (2013.01)

(58) Field of Classification Search
CPC ......... B60W 2520/12; B60W 2720/24; B60W 50/08; G08G 1/167
USPC ...................................... 701/36, 41, 48, 301
See application file for complete search history.

(56) References Cited

U.S. PATENT DOCUMENTS

| | | | | |
|---|---|---|---|---|
| 8,031,063 B2 * | 10/2011 | Schmitz | B60K 31/047 340/439 |
| 8,504,244 B2 * | 8/2013 | Brueggemann | B60W 10/18 701/41 |
| 8,838,323 B2 * | 9/2014 | Matsunaga | B60W 30/10 701/28 |
| 2003/0156015 A1 * | 8/2003 | Winner | B60K 31/0008 340/425.5 |
| 2004/0158377 A1 * | 8/2004 | Matsumoto | B60T 8/17557 701/48 |
| 2007/0115105 A1 | 5/2007 | Schmitz | |
| 2011/0320163 A1 * | 12/2011 | Markkula | B60W 40/076 702/150 |
| 2013/0054106 A1 * | 2/2013 | Schmudderich | B60W 30/0956 701/96 |

(Continued)

FOREIGN PATENT DOCUMENTS

| | | |
|---|---|---|
| JP | 2006-515545 A | 6/2006 |
| JP | 2008-44561 A | 2/2008 |

*Primary Examiner* — Tyler J Lee
(74) *Attorney, Agent, or Firm* — Sughrue Mion, PLLC

(57) ABSTRACT

A drive assistance apparatus includes a target trajectory setting unit configured to set a target trajectory in a lane change assistance based on a movement time taken for a vehicle of which the direction indicator is continued to be in ON-state to move a lateral distance set in advance to the adjacent lane side from an operation start lateral position, and a lane change assistance unit configured to execute the lane change assistance for causing the vehicle to change lane along the target trajectory in a case where the lateral position of the vehicle of which the direction indicator is continued to be in ON-state reaches the assistance start lateral position set in advance in the travelling lane from the setting of the target trajectory by the target trajectory setting unit.

3 Claims, 10 Drawing Sheets

(56) References Cited

U.S. PATENT DOCUMENTS

| | | | | |
|---|---|---|---|---|
| 2013/0085976 | A1* | 4/2013 | Bone | B60W 30/18163 706/46 |
| 2016/0091897 | A1* | 3/2016 | Nilsson | B60W 40/04 701/25 |

* cited by examiner

DRIVE ASSISTANCE APPARATUS

TECHNICAL FIELD

The present disclosure relates to a drive assistance apparatus that performs lane change assistance on a vehicle.

BACKGROUND

Lane change assistance is drive assistance to assist a driver in lane change of a vehicle. The lane change assistance is executed, for example, in a case where it is determined that the driver has an intention to change lane. In Japanese Translation of PCT International Application Publication No. 2006-515545, an apparatus is disclosed, which determines whether or not a driver has an intention to change lane based on a steering angle of a vehicle operated by the driver, a speed or an acceleration of the vehicle, or the like. In addition, in the publication, it is disclosed that the lane change assistance is performed by warning in a case where there is an obstacle in a blind spot of the driver at the time of changing lane based on the result of a determination of whether or not the driver has an intention to change lane.

SUMMARY

Incidentally, as lane change assistance, other than the assistance performed by warning the driver of an obstacle in the blind spot, there is assistance for changing lane by automatically controlling the vehicle. In this case also, it is considered that the lane change assistance for changing lane by controlling the vehicle is executed when it is determined that the driver has an intention to change lane. However, it is not possible to perform vehicle control that matches the steering sense of the driver just by determining the presence or absence of the driver's intention to change lane as in the apparatus in the related art. Therefore, in the lane change assistance for changing lane by controlling the vehicle, there is a case of giving an uncomfortable feeling for the driver.

Therefore, an aspect of the exemplary embodiment has an object of providing a drive assistance apparatus that can reduce the uncomfortable feeling for the driver in the lane change assistance for changing lane by controlling the vehicle.

An aspect of the exemplary embodiment provides a drive assistance apparatus configured to perform lane change assistance for changing lane to an adjacent lane from a travelling lane by controlling a vehicle. The apparatus includes: a target trajectory setting unit configured to set a target trajectory in the lane change assistance based on a lateral position of the vehicle at the time when a direction indicator at the adjacent lane side is in an ON-state, and a movement time taken for the vehicle of which the direction indicator is continued to be in an ON-state to move a lateral distance set in advance to the adjacent lane side from an operation start lateral position which is a lateral position of the vehicle when an amount of steering by a driver of the vehicle toward the adjacent lane side is equal to or greater than a steering amount threshold value in a state in which the direction indicator at the adjacent lane side is in an ON-state; and a lane change assistance unit configured to execute the lane change assistance for causing the vehicle to change lane along the target trajectory in a case where the lateral position of the vehicle of which the direction indicator is continued to be in ON-state reaches the assistance start lateral position set in advance in the travelling lane from the setting of the target trajectory by the target trajectory setting unit. The target trajectory setting unit is configured to set a target trajectory which is shorter in length when the movement time becomes shorter, or in a case where the movement time is shorter than a movement time threshold value, the target trajectory setting unit sets a target trajectory which is shorter in length compared to that in a case where the movement time is equal to or longer than the movement time threshold value.

According to the drive assistance apparatus in an aspect of the exemplary embodiment, in a case where the driver has an intention of a rapid lane change over a short distance, the movement time for the vehicle to move the lateral distance set in advance from the operation start lateral position is considered to be short. Therefore, the target trajectory is set to be shorter in length when the movement time of the vehicle becomes shorter. Alternatively, in a case where the movement time is shorter than the movement time threshold value, the drive assistance apparatus sets a target trajectory which is shorter in length compared to that in a case where the movement time is equal to or longer than the movement time threshold value. Therefore, according to the drive assistance apparatus, it is possible to execute the lane change assistance for causing the vehicle to change lane along the target trajectory in line with the steering feeling of the driver in contrast to a case where the length of the target trajectory is constant regardless of the movement time. Therefore, it is possible to reduce the uncomfortable feeling for the driver in the lane change assistance.

In the drive assistance apparatus described above, a position in the travelling lane separated from the operation start lateral position to the adjacent lane side by the lateral distance may be set to be the assistance start lateral position.

According to the drive assistance apparatus, since the lateral position of the vehicle at the time of finishing the measuring of the movement time becomes the assistance start lateral position, the drive assistance apparatus can avoid the lateral position of the vehicle reaching the assistance start lateral position before measuring the movement time. Therefore, it is possible to set the target trajectory in line with the steering feeling of the driver based on the movement time.

Another aspect of the exemplary embodiment provides a drive assistance apparatus configured to perform lane change assistance for changing lane to an adjacent lane from a travelling lane by controlling a vehicle. The apparatus includes: a target trajectory setting unit configured to set a target trajectory in the lane change assistance based on a lateral speed of the vehicle at the time when the lateral position of the vehicle of which a direction indicator at the adjacent lane side is in an ON-state reaches an assistance start lateral position set in the travelling lane in advance; and a lane change assistance unit configured to execute the lane change assistance for causing the vehicle to change lane along the target trajectory in a case where the target trajectory setting unit sets the target trajectory. The target trajectory setting unit is configured to set a target trajectory which is shorter in length when the lateral speed becomes higher, or in a case where the lateral speed is equal to higher than a lateral speed threshold value, the target trajectory setting unit is configured to set a target trajectory which is shorter in length compared to that in a case where the lateral speed is lower than the lateral speed threshold value.

According to the drive assistance apparatus in another aspect of the exemplary embodiment, in a case where the driver has an intention of a rapid lane change over a short distance, the lateral speed of the vehicle at the time of reaching the assistance start lateral position is considered to be high. Therefore, the target trajectory is set to be shorter in length when the lateral speed becomes higher. Alternatively, in a case where the lateral speed is higher than the lateral speed threshold value, the drive assistance apparatus sets a target trajectory which is shorter in length compared to that in a case where the lateral speed is lower than the lateral speed threshold value. Therefore, according to this drive assistance apparatus, it is possible to execute the lane change assistance for causing the vehicle to change lane along the target trajectory in line with the steering feeling of the driver in contrast to a case where the length of the target trajectory is constant regardless of the lateral speed. Therefore, it is possible to reduce the uncomfortable feeling for the driver in the lane change assistance.

According to an aspect or another aspect of the exemplary embodiment, it is possible to reduce the uncomfortable feeling for the driver in the lane change assistance for changing lane by controlling the vehicle.

DETAILED DESCRIPTION

Hereinafter, preferable embodiments of the exemplary embodiment will be described in detail with reference to the drawings.

First Embodiment

Figure 1:
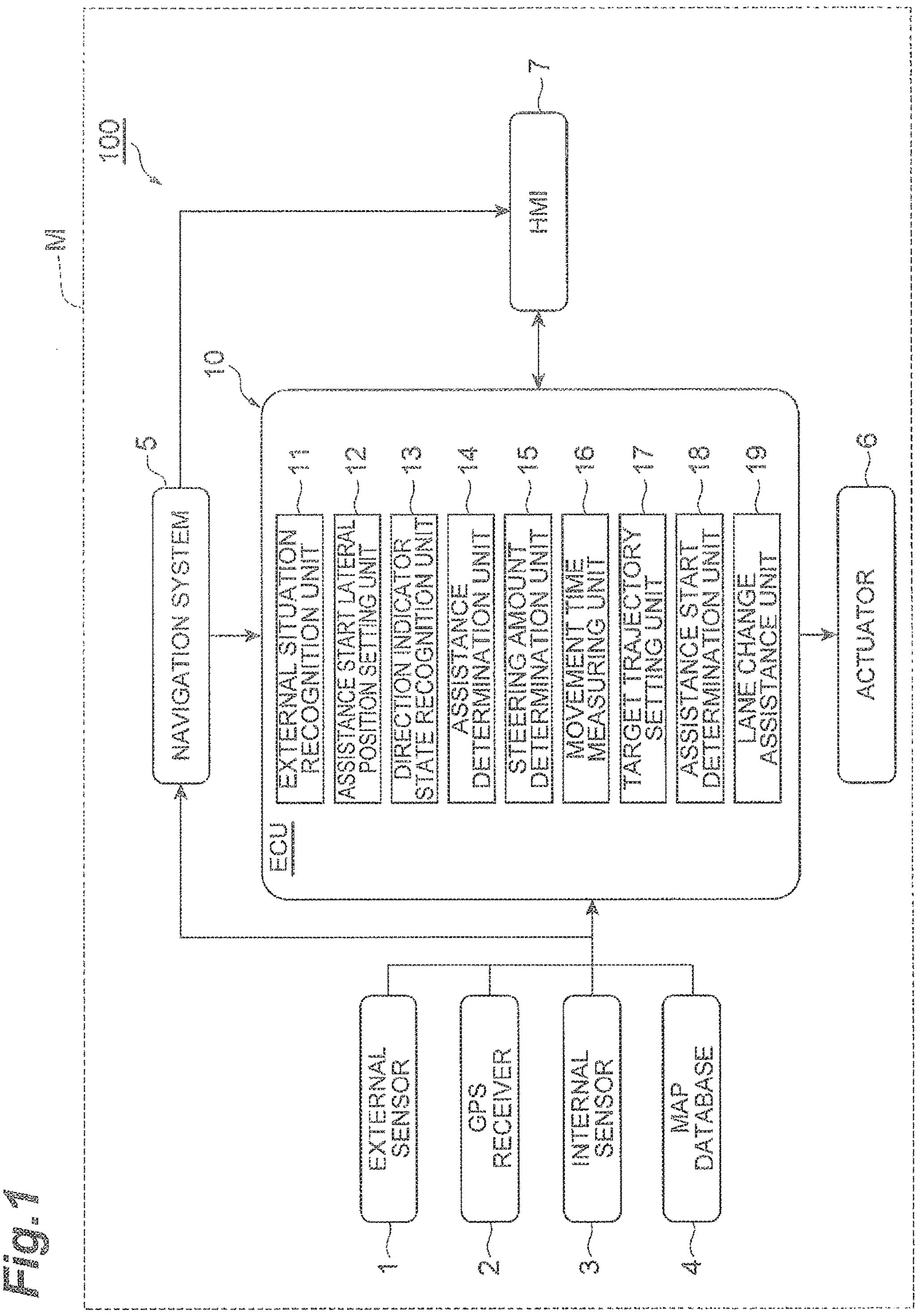
FIG. 1 is a block diagram illustrating a drive assistance apparatus in a first embodiment.

FIG. 1 is a block diagram illustrating a drive assistance apparatus 100 in a first embodiment. The drive assistance apparatus 100 illustrated in FIG. 1 is mounted on a vehicle such as a passenger car and assists lane change of the vehicle by a driver. The drive assistance apparatus 100 performs lane change assistance for automatically changing lane. The details of the lane change assistance in the present embodiment will be described below.

In addition, the drive assistance apparatus 100 may perform a lane keeping assistance (lane trace control: LTC). The lane keeping assistance is a driving assistance for controlling the vehicle such that a lateral position of the vehicle becomes a target lateral position in the travelling lane, and for causing a steering to be reflected in the travelling of the vehicle in a case where there is a steering operation by the driver. The lateral position of the vehicle is a position of the vehicle in a width direction of the travelling lane. The lateral position of the vehicle is, for example, recognized with a center position of the vehicle in a plan view as a reference. The target lateral position is a position of the control target of the vehicle in the lane keeping assistance. The target lateral position is set, for example, at a middle position in the travelling lane in the width direction. In addition, the target lateral position may be set at a position shifted from the middle position of the travelling lane in the width direction of the lane.

Figure 2:
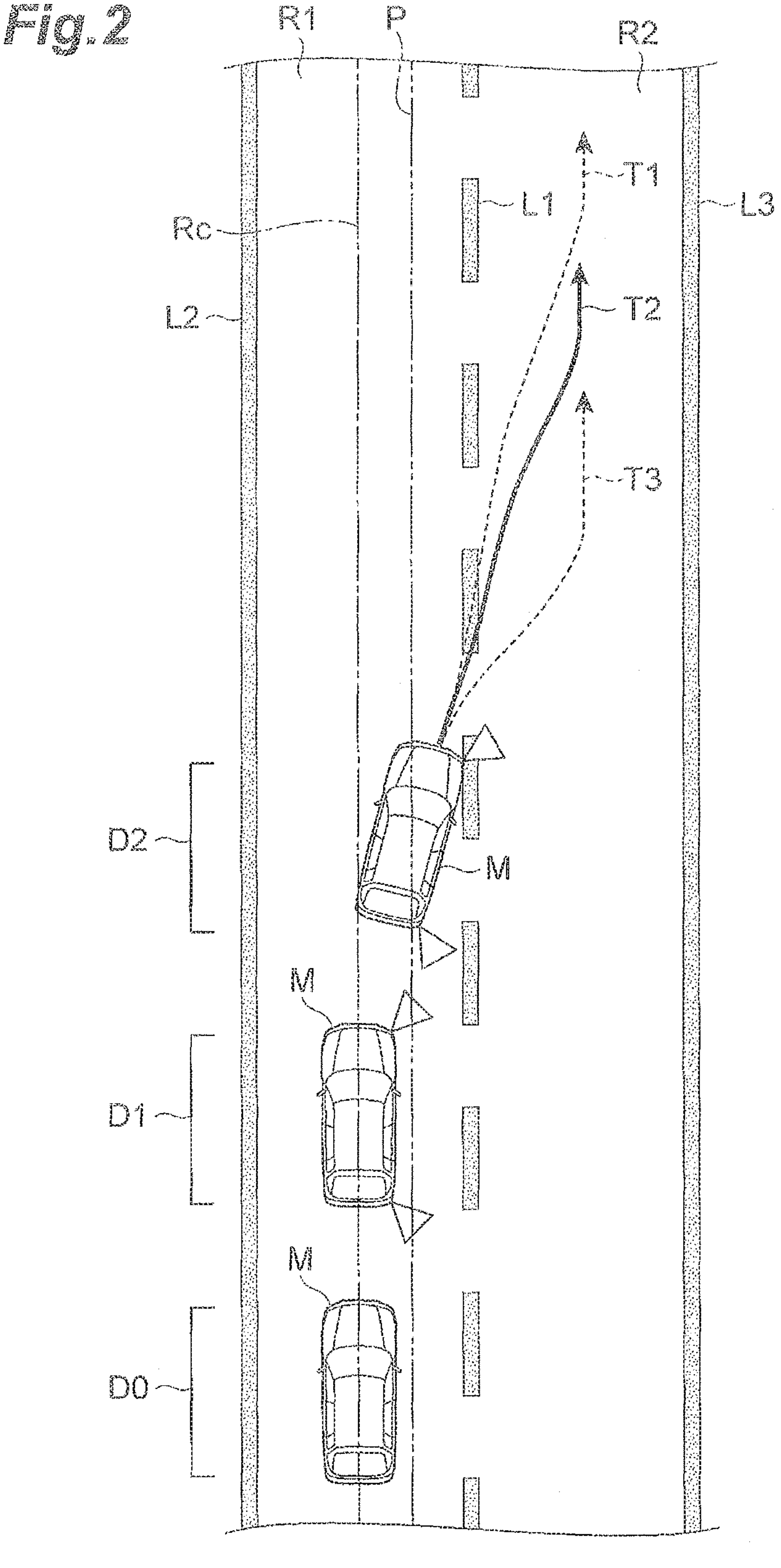
FIG. 2 is a plan view for describing lane change assistance.

Hereinafter, the lane change assistance in the present embodiment will be described with reference to FIG. 2. FIG. 2 is a plan view for describing the lane change assistance. M illustrated in FIG. 2 is a vehicle on which the drive assistance apparatus 100 is mounted. R1 is a travelling lane in which the vehicle M travels. R2 is an adjacent lane adjacent to the travelling lane R1. L1 is a lane line (lane boundary line) which is a boundary between the travelling lane R1 and the adjacent lane R2. L2 is a lane line (roadway traffic zone boundary line) that forms the travelling lane R1 together with the lane line L1. L3 is a lane line (middle line) that forms the adjacent lane R2 together with the lane line L1. Rc is a virtual line indicating a middle position in the travelling lane R1 in a width direction. P is an assistance start lateral position in the lane change assistance.

The assistance start lateral position P is a position set, for example, in the travelling lane R1 in advance, and a position in the travelling lane R1 in the width direction, where the lane change assistance is started when the vehicle M reaches this lateral position. Positions on the lane lines L1 and L2 are included in the travelling lane R1. In addition, setting in advance means setting in advance up to immediately before the processing using the assistance start lateral position P. For example, in a case where it is determined that the lateral position of the vehicle M of which the direction indicator at the adjacent lane R2 side is in an ON-state has reached the assistance start lateral position P, the drive assistance apparatus 100 executes the lane change assistance. The details of the assistance start lateral position P will be described below.

In addition, in FIG. 2, D0, D1, and D2 illustrate a trend of situations before the vehicle M travelling at the middle position Rc in the travelling lane R1 starts the lane change assistance. D0 illustrates a situation in which the vehicle M is travelling along the travelling lane R1 at the middle position Rc. D1 illustrates a situation in which the driver switches the direction indicator at the adjacent lane R2 side to the ON-state from an OFF-state. D2 illustrates a situation in which the lateral position of the vehicle M has reached the assistance start lateral position P.

In FIG. 2, T1 to T3 illustrates target trajectories during the lane change assistance. The target trajectory is a trajectory along which the vehicle M travels during the lane change assistance. The target trajectory corresponds to time series data of the steering control of the vehicle during the lane change assistance. The target trajectories T1 to T3 are trajectories from the position of the vehicle M to the middle position of the adjacent lane R2 (middle position in the adjacent lane R2 in the width direction) in the situation D2. End points of the target trajectories T1 to T3 may be in the adjacent lane R2 not limited to the middle position of the adjacent lane R2. For example, the end points of the target trajectories T1 to T3 can be positioned separated from the middle position of the adjacent lane R2 by 0.2 m to the travelling lane R1 side.

The target trajectories T1 to T3 are different in length from each other. The target trajectory T1 is a trajectory having the shortest length among the target trajectories T1 to T3. The target trajectory T2 is a trajectory having a length longer than that of the target trajectory T1 and shorter than that of the target trajectory T2. The target trajectory T3 is a trajectory having the longest length among the target trajectories T1 to T3. The drive assistance apparatus 100 sets (selects) the target trajectory used in the lane change assistance from the target trajectories T1 to T3.

As illustrated in FIG. 2, for example, in a case where the lateral position of the vehicle M of which the direction indicator at the adjacent lane side is in an ON-state reaches the assistance start lateral position P, the drive assistance apparatus 100 executes the lane change assistance. The drive assistance apparatus 100 executes the lane change assistance automatically causing the vehicle M to change lane along any one of the target trajectories T1 to T3. In a case where a driving operation by the driver is input, the drive assistance apparatus 100 may reflect the driving operation in the travelling even when the lane change assistance is executed. In a case where it is determined that the lane change assistance cannot be performed such as a case where other vehicles travelling parallel to the vehicle M are present in the adjacent lane R2, the drive assistance apparatus 100 does not execute the lane change assistance even if the lateral position of the vehicle M reaches the assistance start lateral position P.

Figure 3:
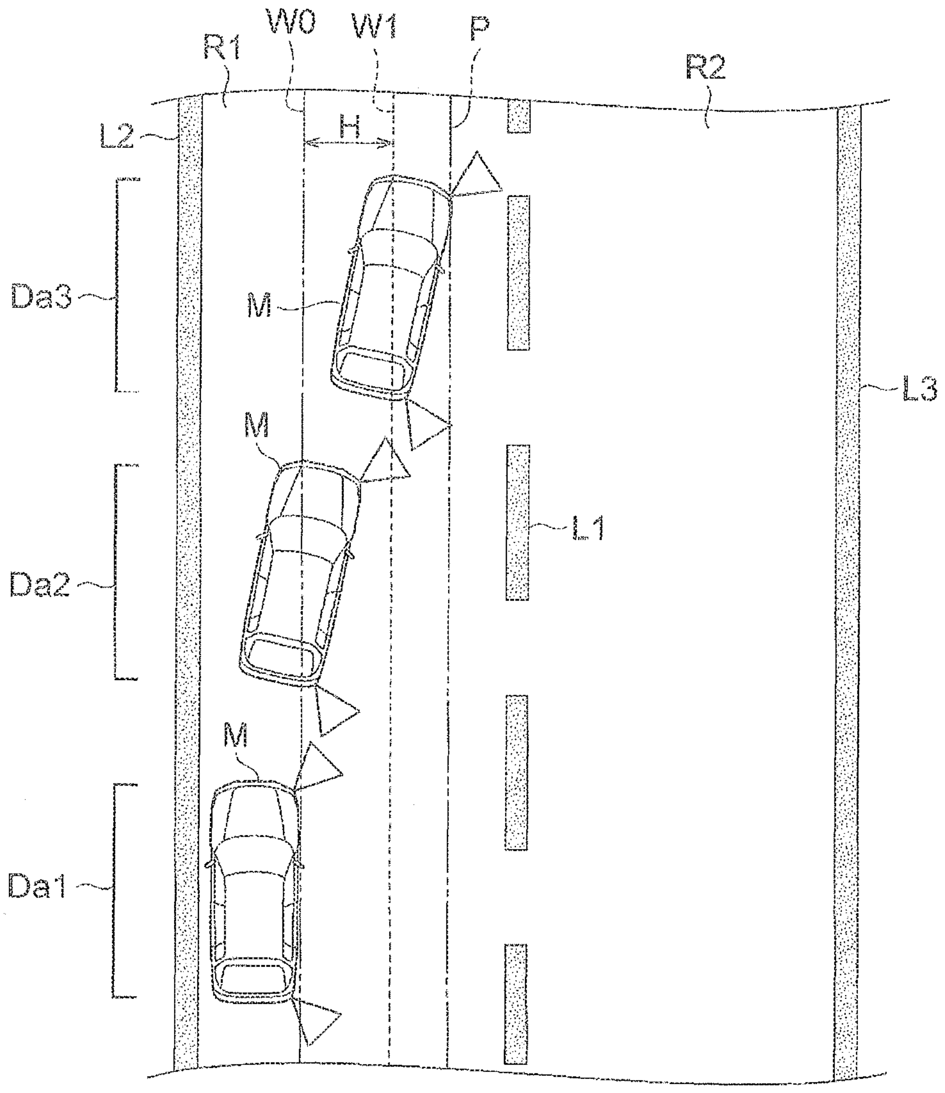
FIG. 3 is a plan view for describing measuring a movement time in the first embodiment.

Next, the setting of the target trajectory will be described. The drive assistance apparatus 100 sets the target trajectory based on the movement time taken for the vehicle M to move the lateral distance set in advance from the operation start lateral position to the adjacent lane side. Here, FIG. 3 is a plan view for describing a movement time. W0 illustrated in FIG. 3 is an operation start lateral position. W1 is a measurement finish lateral position. H is a lateral distance. The measurement finishing lateral position W1 is a lateral position in the travelling lane R1 separated from the operation start lateral position W0 to the adjacent lane R2 side by the lateral distance H. In other words, the lateral distance H corresponds to a distance between the operation start lateral position W0 and the measurement finishing lateral position W1.

The operation start lateral position W0 is, for example, in a state in which the direction indicator at the adjacent lane R2 side is in an ON-state, a lateral position of the vehicle M when the amount of steering by the driver to the adjacent lane R2 side is equal to or greater than the steering amount threshold value. The amount of steering is, for example, a steering angle or a steering torque of the steering wheel of the vehicle M according to the driver. The steering amount threshold value is a threshold value set in advance for determining that the driver performs steering with an intention to change lane. The steering amount threshold value may be a fixed value or may be a value that varies according to a shape of the travelling lane, a vehicle speed or the lateral position of the vehicle M, and the like. The operation start lateral position W0 may be a lateral position of the vehicle M when the direction indicator at the adjacent lane R2 side is in ON-state by the operation of the driver.

The lateral distance H is a value set for use in measuring the movement time. The lateral distance H is a distance in the width direction of the travelling lane R1, and for example, can be set to be 0.5 m. The lateral distance H may be a fixed value or may be a value that varies according to the vehicle speed, a lane width of the travelling lane R1, or the like.

The movement time is a time taken for the vehicle M to move the lateral distance H set in advance from the operation start lateral position W0 to the adjacent lane R2 side. The movement time can be considered to change, for example, according to a rapidity of the lane change intended by the driver. That is, it can be considered that, for a driver having an intention to rapidly change lane over a short distance in a short time, the movement time is short, and for the driver having an intention to slowly change lane over a long distance in a long time, the movement time is long. Therefore, the drive assistance apparatus 100 executes the lane change assistance in line with the intention of the driver by setting the target trajectories which are different from each other in length according to the movement time.

In FIG. 3, for convenience of illustration, a case where the vehicle M travels at a position at the left side in the travelling lane R1 is illustrated. In FIG. 3, Da1, Da2, and Da3 illustrate a trend of the situations before the time when the lateral position of the vehicle M reaches the assistance start lateral position P and the lane change assistance is started.

Da1 illustrates a situation in which the direction indicator at the adjacent lane R2 side is switched to an ON-state from an OFF-state by the driver of the vehicle M travelling in the travelling lane R1. Da2 illustrates a situation in which the amount of steering by the driver to the adjacent lane R2 side is equal to or greater than the steering amount threshold value in the vehicle M of which the direction indicator at the adjacent lane R2 side is continued to be in ON-state. The lateral position of the vehicle M in this situation of Da2 is the operation start lateral position W0. Da3 illustrates a situation in which the vehicle M has moved the lateral distance H from the operation start lateral position W0 to the adjacent lane R2 side. In FIG. 3, the lateral position of the vehicle M in the situation of Da3 is the measurement finishing lateral position W1.

The drive assistance apparatus 100 measures the time taken for the vehicle M of which the direction indicator at the adjacent lane R2 side is continued to be in ON-state moves the lateral distance H from the operation start lateral position W0 to the adjacent lane R2 side. In other words, the drive assistance apparatus 100 measures the time taken for the lateral position of the vehicle M of which the direction indicator at the adjacent lane R2 side is continued to be in ON-state to reach the measurement finishing lateral position W1 from the operation start lateral position W0. The measurement finishing lateral position W1 may be coincident with the assistance start lateral position P described above. That is, the assistance start lateral position P may be positioned in the travelling lane R1 separated from the operation start lateral position W0 to the adjacent lane R2 side by the lateral distance H.

The drive assistance apparatus 100 sets the target trajectory based on the measured movement time. The drive assistance apparatus 100 sets for example, a target trajectory which is shorter in length when the movement time becomes shorter. In addition, the drive assistance apparatus 100 may set target trajectories which are different from each other in length in stepwise manner according to the movement time. For example, in a case where the movement time is value is longer than a first movement time threshold, the drive assistance apparatus 100 assumes that the driver has an intention of slow lane change assistance over the long distance and sets the target trajectory T1 which is the longest one in length among the target trajectories T1 to T3. For example, in a case where the movement time is shorter than the first movement time threshold value and is longer than a second movement time threshold value which is shorter than the first movement time threshold value, the drive assistance apparatus 100 assumes that the driver has an intention of average lane change assistance and sets the target trajectory T2 among the target trajectories T1 to T3. For example, in a case where the movement time is shorter than the second movement time threshold value, the drive assistance apparatus 100 assumes that the driver has an intention of rapid lane change assistance over a short distance and sets the target trajectory T3 which is the shortest one in length among the target trajectories T1 to T3. The first movement time threshold value and the second movement time threshold value are threshold values used for setting the target trajectory in line with the intention of the driver. The first movement time threshold value and the second movement time threshold value may fixed values or may be varying values.

Configuration of the Drive Assistance Apparatus in the First Embodiment

Hereinafter, a configuration of the drive assistance apparatus 100 in the first embodiment will be described with reference to FIG. 1. As illustrated in FIG. 1, the drive assistance apparatus 100 is mounted on a vehicle M such as an automobile. The drive assistance apparatus 100 includes an external sensor 1, a global positioning system (GPS) receiver 2, an internal sensor 3 a map database 4, a navigation system 5, an actuator 6, an electronic control unit (ECU) 10, and a human machine interface (HMI) 7.

The external sensor 1 is a detection device configured to detect an external situation which is surroundings information of the vehicle M. The external sensor 1 at least includes a camera. The camera is, for example, provided on the inside of windshield of the vehicle M. The camera transmits the image information relating to the external situation to the ECU 10. The camera may be a monocular camera or may be a stereo camera. The stereo camera has two imaging units that are arranged so as to reproduce a binocular parallax.

The external sensor 1 may include radar or a laser imaging direction and ranging (LIDER). The radar detects an obstacle outside of the vehicle M using a radio wave (for example, a millimeter wave). The radar detects the obstacle by transmitting the radio wave to the surroundings of the vehicle M and receiving the wave reflected from the obstacle. The radar transmits the detected obstacle information to the ECU 10. The LIDER detects an obstacle outside of the vehicle M using light.

The LIDER detects the obstacle outside the vehicle M using light. The LIDER transmits the light to the surroundings of the vehicle M, measures the distance to the reflection point by receiving the light reflected from the obstacle, and then, detects the obstacle. The LIDER transmits the detected obstacle information to the ECU 10.

The GPS receiver 2 receives signals from three or more GPS satellites and measures the position of the vehicle M (for example, the latitude and longitude of the vehicle M). The GPS receiver 2 transmits the measured position information of the vehicle M to the ECU 10. Instead of the GPS receiver 2, another means for specifying the latitude and the longitude of the vehicle M may be used.

The internal sensor 3 is a detection device configured to detect the travelling state of the vehicle M and the driving operations of the driver. The internal sensor 3 includes at least one of a vehicle speed sensor, an acceleration sensor, and a yaw rate sensor. The vehicle speed sensor is a detection device configured to detect the speed of the vehicle M. As the vehicle speed sensor, for example, a wheel speed sensor is used, which is provided on vehicle wheels of the host vehicle M or a drive shaft and the like rotating integrally with vehicle wheels and detects a rotational speed of the vehicle wheels. The vehicle speed sensor transmits the detected vehicle speed information (wheel speed information) to the ECU 10.

The acceleration sensor is a detection device configured to detect an acceleration of the vehicle M. The acceleration sensor includes, for example, a longitudinal acceleration sensor that detects acceleration in the longitudinal direction of the vehicle M and a lateral acceleration sensor that detects a lateral acceleration of the vehicle M.

The acceleration sensor transmits, for example, the acceleration information of the vehicle M to the ECU 10. The yaw rate sensor is a detection device of the vehicle M configured to detect a yaw around the vertical axis of the center of gravity of the vehicle M (rotational angular velocity). As the yaw rate sensor, for example, a gyro sensor can be used. The yaw rate sensor transmits the detected yaw rate information of the vehicle M to the ECU 10.

In addition, the internal sensor 3 includes a steering sensor and a direction indicator sensor. The steering sensor is provided, for example, on the steering shaft of the vehicle M and detects at least one of the steering torque given to the steering wheel by the driver and a steering angle of the steering wheel. The steering sensor transmits the detected steering information relating to the steering by the driver to the ECU 10. The steering sensor does not necessarily need to be included in a case where the drive assistance apparatus 100 does not use the amount of steering in determining the operation start lateral position W0.

The direction indicator sensor is provided, for example, on a direction indicator lever of the vehicle M, and detects the operation of the direction indicator lever by the driver. The direction indicator sensor detects whether the operation of the direction indicator lever by the driver is the operation of the direction indicator lever to the right direction or the operation of the direction indicator lever to the left direction. The direction indicator sensor transmits the detected direction indicator information to the ECU 10.

The map database 4 is a database in which map information is included. The map database is formed, for example, in a hard disk drive (HDD) mounted on the vehicle. In the map information, for example, position information of roads, information on road types (for example, type of a curve, a straight portion, and a curvature of the curve), and position information of intersections, and branch points are included. Information of a road section where lane change is prohibited by traffic regulations may be included in the map information. Furthermore, in order to use the position information of a shielding structure such as a building or a wall and simultaneous localization and mapping technology (SLAM), it is preferable that the map information include an output signal of the external sensor 1. The map database does not necessarily need to be mounted on the vehicle M, and may be stored in a computer in a facility such as an information processing center which is capable of communicating with the vehicle M.

The navigation system 5 is a device configured to perform guidance to a destination set by a driver of the vehicle M for a driver of the vehicle M. The navigation system 5 calculates a travelling route of the host vehicle M based on the position information of the host vehicle M measured by the GPS receiver 2 and the map information in the map database 4.

The route may be a route in which a preferable lane is specified on a multi-lane road section. The navigation system 5 calculates, for example, a target route from the position of the vehicle M to the destination and performs notification to the driver of the target route by display on a display or a voice output of a speaker. In the target route, information on the road section where the vehicle M is subject to change the lane may be included. The navigation system 5, for example, transmits the target route information of the vehicle M to the ECU 10. The navigation system 5 does not necessarily need to be included.

The actuator 6 is a device configured to perform a travel control of the vehicle M. The actuator 6 includes at least a throttle actuator, a brake actuator, and a steering actuator. The throttle actuator controls a supply amount (throttle opening degree) of air to an engine according to a control signal from the ECU 10, and controls the driving power of the vehicle M. In a case where the vehicle M is a hybrid vehicle or an electric vehicle, the throttle actuator is not included, and thus, the driving power is controlled by a control signal from the ECU 10 being input to a motor which is a source of the driving force.

The brake actuator controls a brake system according to a control signal from the ECU 10 and controls the braking force given to the wheels of the vehicle M. For example, a hydraulic brake system can be used as the brake actuator. The steering actuator controls the driving of an assist motor that controls the steering torque in the electric power steering system according to a control signal from the ECU 10. In this way, the steering actuator controls the steering torque of the vehicle M.

The HMI 7 is an interface configured to perform input and output of information between the driver and the drive assistance apparatus 100. The HMI 7 includes, for example, a display panel for displaying the image information for the driver, a speaker for audio output, and an operation button or a touch panel for the driver to perform an input operation. The HMI 7 transmits the information input by the driver (for example, ON and OFF of the lane change assistance) to the ECU 10. In addition, the HMI 7 performs displaying or voice output of the image information according to a control signal from the ECU 10. The drive assistance apparatus 100 does not necessarily need to include the HMI 7.

Next, a functional configuration of the ECU 10 will be described. The ECU 10 is an electronic control unit including a central processing unit (CPU), a read only memory (ROM), a random access memory (RAM), and the like. In the ECU 10, various controls are performed by loading a program stored in the ROM into the RAM and the program being executed by the CPU. The ECU 10 may be configured with a plurality of electronic control units. A part of the functions of the ECU 10 may be executed by a computer in a facility such as an information processing center which is capable of communicating with the vehicle M.

The ECU 10 includes an external situation recognition unit 11, an assistance start lateral position setting unit 12, a direction indicator state recognition unit 13, an assistance determination unit 14, a steering amount determination unit 15, a movement time measuring unit 16, a target trajectory setting unit 17, an assistance start determination unit 18, and a lane change assistance unit 19.

The external situation recognition unit 11 recognizes external situations of the vehicle M based on the detection results (for example, image information from the camera, obstacle information from the radar, and obstacle information from the LIDER) of the external sensor 1. In the external situation, for example, the positions and types (types of line such as a dashed line or a continuous line) of the lane lines L1 and L2 of the travelling lane R1 in which the vehicle M travels, the positions and types of the lane lines L1 and L3 of the adjacent lane R2, and the middle position Rc in the width direction of the travelling lane R1 are included. In the external situation, obstacle (moving obstacles such as other vehicles or pedestrians, and fixed obstacles such as buildings) information on the surroundings of the vehicle M is also included. The external situation recognition unit 11 may recognize the external situation by a vehicle-to-vehicle communication or a road-to-vehicle communication via a communication unit.

The assistance start lateral position setting unit 12 sets the assistance start lateral position P in the travelling lane R1. An example of the assistance start lateral position P set by the assistance start lateral position setting unit 12 will be described with reference to FIG. 4A to FIG. 4C.

Figure 4A:
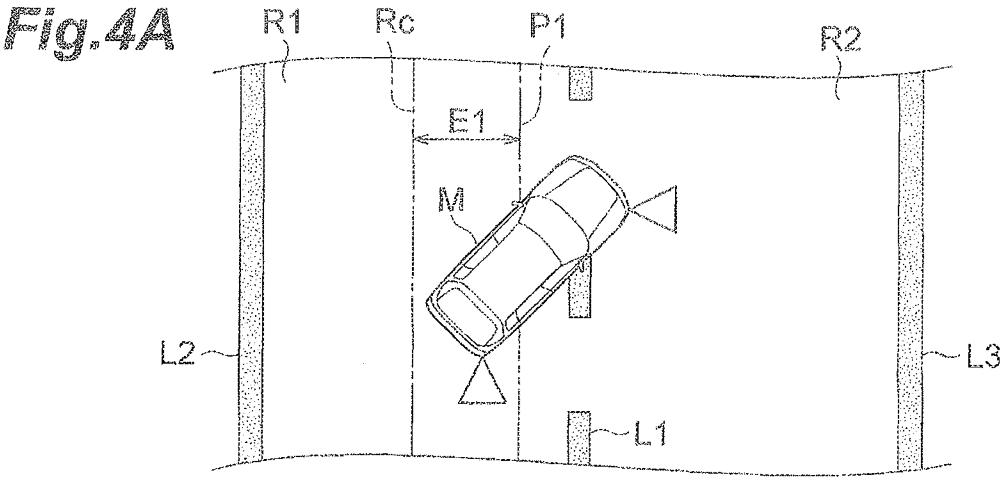
FIG. 4A is a plan view for describing an assistance start lateral position with a middle position in the travelling lane as a reference point.

FIG. 4A is a plan view for describing an assistance start lateral position P1 with the middle position Rc in the travelling lane R1 as a reference point. As illustrated in FIG. 4A, the assistance start lateral position setting unit 12 sets the assistance start lateral position P1, for example, with the middle position Rc in the travelling lane R1 as a reference point. Specifically, the assistance start lateral position setting unit 12 sets a position separated from the middle position Rc in the travelling lane R1 to the adjacent lane R2 side by a first distance E1 set in advance as the assistance start lateral position P1. The first distance E1 can be any arbitrary value within the distance of shorter than half the lane width of the travelling lane R1, but, for example, may be equal to or longer than 0.1 m. The first distance E1 may be a fixed value (for example, 1.5 m) or may be a value that varies according to the speed of the vehicle M or the like.

Figure 4B:
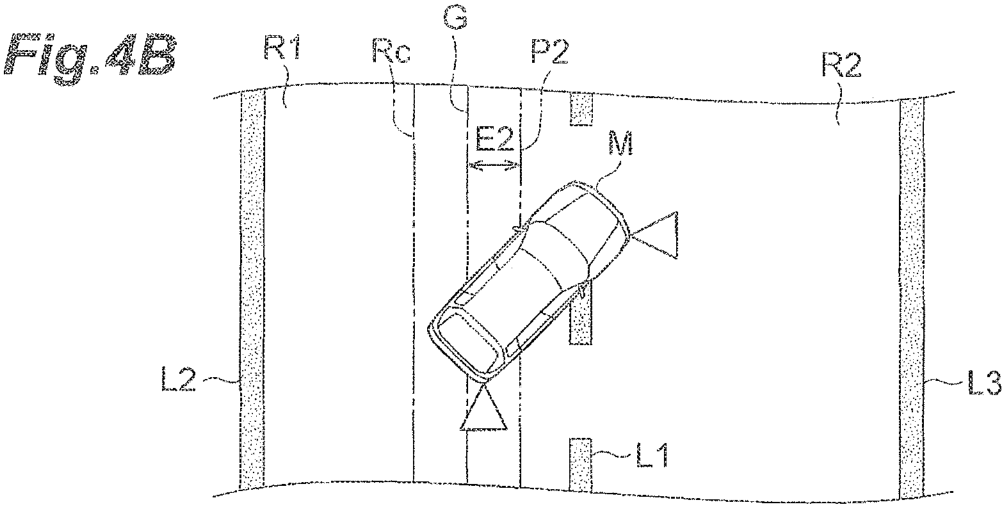
FIG. 4B is a plan view for describing an assistance start lateral position with a target lateral position as a reference point.

FIG. 4B is a plan view for describing an assistance start lateral position P2 with the target lateral position G as a reference point. The lane keeping assistance is executed in the vehicle M illustrated in FIG. 4B. Here, the target lateral position G is a lateral position in the travelling lane R1 which is a control target of the vehicle M during the lane keeping assistance. Here, as an example, the target lateral position G is set at a position shifted to the adjacent lane R2 side from the middle position Rc in the travelling lane R1. As illustrated in FIG. 4B, the assistance start lateral position setting unit 12 sets a position separated from the target lateral position G to the adjacent lane R2 side by a second distance E2 set in advance as the assistance start lateral position P2. The second distance E2 can be, for example, similar to the first distance E1.

Figure 4C:
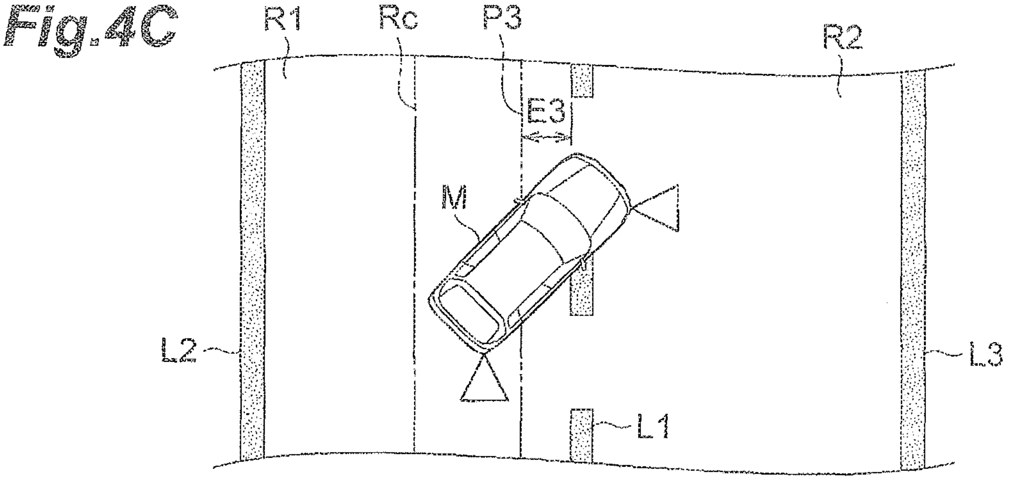
FIG. 4C is a plan view for describing an assistance start lateral position with a lane boundary line which is a boundary between a travelling lane and an adjacent lane as a reference point.

FIG. 4C is a plan view for describing the assistance start lateral position P3 with the lane boundary line L1 which is a boundary between the travelling lane R1 and the adjacent lane R2 as a reference point. The lane keeping assistance is not executed in the vehicle M illustrated in FIG. 4C, but may be executed. As illustrated in FIG. 4C, the assistance start lateral position setting unit 12 may set the assistance start lateral position P3 with the lane line L1 as a reference point. Specifically, the assistance start lateral position setting unit 12 sets a position separated from the lane line L1 toward the inside of the travelling lane R1 in the width direction of the travelling lane R1 by a third distance E3 set in advance as the assistance start lateral position P3. The third distance E3 can be, for example, similar to the first distance E1. The assistance start lateral position setting unit 12 may define the position of the lane line L1 to be the assistance start lateral position P3.

In addition, the assistance start lateral position setting unit 12 may define the measurement finishing lateral position W1 illustrated in FIG. 3 to be the assistance start lateral position P. That is, when the operation start lateral position W0 is determined by the driving operations of the driver, the assistance start lateral position setting unit 12 may set the measurement finishing lateral position W1 separated from the operation start lateral position W0 to the adjacent lane R2 side by the lateral distance H to be the assistance start lateral position P. The assistance start lateral position setting unit 12 may set a plurality of assistance start lateral positions P or may set the assistance start lateral position P with respect to the travelling lane R1 and the assistance start lateral position P determined from the operation start lateral position W0 respectively.

In addition, the assistance start lateral position setting unit 12 may set assistance start lateral positions P different from each other according to the lateral position of the vehicle M in a case where it is determined by the direction indicator state recognition unit 13 described below that the direction indicator at the adjacent lane R2 side is in an ON-state. When, for example, the lateral position of the vehicle M in a case where it is determined that the direction indicator at the adjacent lane R2 side is in an ON-state is located at the left side of the middle position Rc in the travelling lane R1, the assistance start lateral position setting unit 12 sets the assistance start lateral position P (for example, the assistance start lateral position P separated from the middle position Rc to the adjacent lane R2 side by 0.5 m) with the middle position Rc in the travelling lane R1 as the reference point. On the other hand, when, for example, the lateral position of the vehicle M in a case where it is determined that the direction indicator at the adjacent lane R2 side is in an ON-state is located at the right side of the middle position Rc in the travelling lane R1, the assistance start lateral position setting unit 12 sets the measurement finishing lateral position W1 which is separated from the operation start lateral position W0 to the adjacent lane R2 side by the lateral distance H as the assistance start lateral position P.

The direction indicator state recognition unit 13 recognizes a state of the direction indicator of the vehicle M based on direction indicator information from the direction indicator sensor in the internal sensor 3. The direction indicator state recognition unit 13 determines (recognizes) switching between the ON-state and OFF-state of the right and left direction indicators.

In a case where any of the right or left direction indicator is determined to have been switched from the OFF-state to the ON-state, the direction indicator state recognition unit 13 recognizes the presence of the adjacent lane R2 which is adjacent to the travelling lane R1 in which the vehicle M travels. The direction indicator state recognition unit 13 recognizes the adjacent lane R2 using a known image analysis method based on, for example, the image information from the camera in the external sensor 1. The direction indicator state recognition unit 13 may recognize the adjacent lane R2 based on the position information of the vehicle M from the GPS receiver 2 and the map information from the map database 4. In a case where the adjacent lane R2 is recognized, the direction indicator state recognition unit 13 determines whether or not the direction indicator at the adjacent lane R2 side is in an ON-state among the direction indicators at the right and the left side. The direction indicator state recognition unit 13 may constantly perform the recognition of the adjacent lane R2.

For example, in a case where it is recognized by the direction indicator state recognition unit 13 that the direction indicator at the adjacent lane R2 side is in an ON-state, the assistance determination unit 14 determines whether or not the lane change assistance can be performed, which causes the vehicle M to change lane by controlling the vehicle M. For example, in a case where another vehicle which travels parallel to the vehicle M in the adjacent lane R2 is recognized based on the obstacle information from the radar or the LIDER in the external sensor 1, the assistance determination unit 14 determines that the lane change assistance can be performed.

In addition, in a case where it is recognized that the vehicle M is in a road section where lane change is prohibited (for example, in the vicinity of a branch path or an intersection, a road section where lane change is prohibited by traffic regulations, or the like) based on, for example, the position information of the vehicle M from the GPS receiver 2 and the map information from the map database 4, the assistance determination unit 14 may determine that the lane change assistance cannot be performed. Furthermore, in a case where the vehicle speed of the vehicle M is lower than the vehicle speed threshold value based on the vehicle speed information from the vehicle speed sensor in the internal sensor 3, the assistance determination unit 14 may determine that the lane change assistance cannot be performed. The vehicle speed threshold value is, for example, 60 km/h.

For example, in a case where it is determined by the direction indicator state recognition unit 13 that the direction indicator at the adjacent lane R2 side is in an ON-state, the steering amount determination unit 15 determines whether or not the amount of steering (for example, the steering angle and the steering torque) of the steering wheel of the vehicle M to the adjacent lane R2 side by the driver is equal to or greater than the steering amount threshold value. The steering amount determination unit 15 determines whether or not the amount of steering to the adjacent lane R2 side is equal to or greater than the steering amount threshold value based on the steering information from the steering sensor in the internal sensor 3. In this case, the lateral position of the vehicle M when the amount of steering to the adjacent lane R2 side is equal to or greater than the steering amount threshold value is the operation start lateral position W0.

The lateral position of the vehicle M when it is determined by the direction indicator state recognition unit 13 that the direction indicator at the adjacent lane R2 side is in an ON-state may be adopted as the operation start lateral position W0. In this case, the steering amount determination unit 15 is not necessary.

In a case where it is determined by the steering amount determination unit 15 that the amount of steering to the adjacent lane R2 side is equal to or greater than the steering amount threshold value, the movement time measuring unit 16 determines whether or not the vehicle M of which the direction indicator at the adjacent lane R2 side is continued to be in ON-state has moved the lateral distance H set in advance from the from the operation start lateral position W0 to the adjacent lane R2 side. The movement time measuring unit 16 determines whether or not the vehicle M has moved the lateral distance H to the adjacent lane R2 side by recognizing the positional relationship between the lane lines L1 and L2 of the travelling lane R1 and the vehicle M based on, for example, the image information from the camera in the external sensor 1.

Specifically, the movement time measuring unit 16 recognizes the position of the lane lines L1 and L2 in front of the vehicle M in the image based on, for example, the image information from the camera in the external sensor 1. The movement time measuring unit 16 recognizes the lateral position of the vehicle M in the travelling lane R1 using a known method based on the positional relationship of the lane lines L1 and L2 with the center of the image in the image as a reference point. In this case, the lateral position of the vehicle M can be recognized with the center position (the center position in the travelling lane R1 in the width direction) of the vehicle M in a plan view as a reference point. The lateral position of the vehicle M may be recognized with the center position of the vehicle M in a plan view as a reference point. The width direction of the travelling lane R is, for example, a direction orthogonal to the direction of the lane lines L1 and L2.

In addition, in a case where it is determined by the steering amount determination unit 15 that the amount of steering to the adjacent lane R2 side is equal to or greater than the steering amount threshold value, the movement time measuring unit 16 starts to measure the movement time. In a case where it is determined that the vehicle M has moved the lateral distance H to the adjacent lane R2 side, the movement time measuring unit 16 finishes the measuring of the movement time. The movement time measuring unit 16 measures the time taken from the time when the steering amount threshold value is determined by the steering amount determination unit 15 to the time when the vehicle M is determined to have moved the lateral distance H to the adjacent lane R2 side as the movement time. In other words, the movement time measuring unit 16 measures the time taken for the vehicle M to move the lateral distance H set in advance from the operation start lateral position W0 to the adjacent lane R2 side as the movement time.

In a case where the lateral position of the vehicle M when it is determined by the direction indicator state recognition unit 13 that the direction indicator at the adjacent lane R2 side is determined to be in an ON-state is adopted as the operation start lateral position W0, the movement time measuring unit 16 measures the time taken for the vehicle M to move the lateral distance H to the adjacent lane R2 side as the movement time.

The target trajectory setting unit 17 sets the target trajectory of the lane change assistance based on, for example, the movement time measured by the movement time measuring unit 16. The target trajectory setting unit 17 sets the target trajectories which are different from each other in length according to the movement time. The target trajectory setting unit 17 sets, for example, a target trajectory which is shorter in length when the movement time becomes shorter. The length of the target trajectory is, for example, a total length of the trajectory from the current position of the vehicle M to the end point of the target trajectory. A length along the extending direction of the travelling lane R1 may be used as the length of the target trajectory. The target trajectory setting unit 17 sets the target trajectory of which the end point is closer to the current position of the vehicle M when the movement time becomes shorter. The target trajectory setting unit 17 may set the target trajectory with a sharper change of the trajectory (an amount of change of a control target value of the steering) being allowed when the movement time becomes shorter. The target trajectory setting unit 17 may generate a target trajectory that becomes the base using a known method and modify the length of the base target trajectory according to the movement time, and then, may perform the setting of the target trajectory based on the movement time.

The target trajectory setting unit 17 may set target trajectories which are different from each other in length in a step wise manner based on the movement time (refer to FIG. 2). For, example, in a case where the movement time is shorter than the movement time threshold value set in advance, the target trajectory setting unit 17 sets a target trajectory which is shorter in length compared to that in a case where the movement time is equal to or longer than the movement time threshold value. The movement time threshold value is not limited to one value. The target trajectory setting unit 17 sets target trajectories which are different from each other in length according to, for example, the comparison result between the movement time and the movement time threshold value. The target trajectory setting unit 17 may generate a plurality of target trajectories which are different from each other in length with the assistance start lateral position P as a start point, and may set one target trajectory among the plurality of target trajectories based on the comparison result between the movement time and the movement time threshold value. A known method can be adopted as the specific method of setting the target trajectory.

In a case where the distance between the operation start lateral position W0 and the assistance start lateral position P is shorter than the lateral distance H and in a case where the movement time cannot be measured before starting of the lane change assistance, the target trajectory setting unit 17 sets the target trajectory without using the movement time.

In addition, the target trajectory setting unit 17 may set the target vehicle speed pattern of the vehicle M (time series data of the control target value in the vehicle speed control) according to the target trajectory. The target trajectory setting unit 17 sets the target vehicle speed pattern from, for example, the current vehicle speed of the vehicle M within the range which does not give an uncomfortable feeling for the driver. The target trajectory setting unit 17 sets the target vehicle speed pattern such that, for example, the vehicle speed at the end point of the target trajectory becomes the vehicle speed set in advance. In a case where the lane keeping assistance is executed in the vehicle M, the vehicle speed set in the lane keeping assistance can be used as the vehicle speed in advance. The vehicle speed set in advance may be a fixed value or may be a value that varies according to the vehicle speed of the vehicle M at the time when the lane change assistance starts.

The target trajectory setting unit 17 may set the target vehicle speed pattern based on the movement time. The target trajectory setting unit 17 sets a target vehicle speed pattern that finishes the lane change within a shorter time while allowing a sharper change of the speed (acceleration or deceleration) and a higher upper limit of the speed when the movement time becomes shorter.

The assistance start determination unit 18 determines whether or not the lateral position of the vehicle M of which the direction indicator at the adjacent lane R2 side is in an ON-state has reached the assistance start lateral position P. The assistance start determination unit 18 determines whether or not the lateral position of the vehicle M has reached the assistance start lateral position P by recognizing the positional relationship between the lane lines L1 and L2 of the travelling lane R1 and the vehicle M based on, for example, the image information from the camera in the external sensor 1. In addition, the assistance start determination unit 18 may display the distance required for the lateral position of the vehicle M to reach the assistance start lateral position P on the HMI 7. In a case where it is determined that the lateral position of the vehicle M of which the direction indicator at the adjacent lane R2 side is in an ON-state has reached the assistance start lateral position P, the assistance start determination unit 18 may notify the driver of starting of the lane change assistance by a voice output from the HMI 7.

In a case where it is determined by the assistance start determination unit 18 that the lateral position of the vehicle M of which the direction indicator at the adjacent lane R2 side is in an ON-state has reached the assistance start lateral position P, the lane change assistance unit 19 executes the lane keeping assistance for causing the vehicle M to maintain a lane along the target trajectory set by the target trajectory setting unit 17. The lane change assistance unit 19 transmits a control signal to the actuator 6 such that the vehicle M travels along the target trajectory (and the target vehicle speed pattern) set by the target trajectory setting unit 17.

In a case where the lateral position of the vehicle M of which the direction indicator at the adjacent lane R2 side is continued to be in ON-state reaches the assistance start lateral position P from the setting of the target trajectory by the target trajectory setting unit 17, the lane change assistance unit 19 executes the lane change assistance. The case where the lateral position of the vehicle M of which the direction indicator at the adjacent lane R2 side is continued to be in ON-state reaches the assistance start lateral position P from the setting of the target trajectory by the target trajectory setting unit 17 includes the case where the lateral position of the vehicle M of which the direction indicator at the adjacent lane R2 side is continued to be in ON-state reaches the assistance start lateral position P simultaneously with the setting of the target trajectory by the target trajectory setting unit 17.

Figure 5:
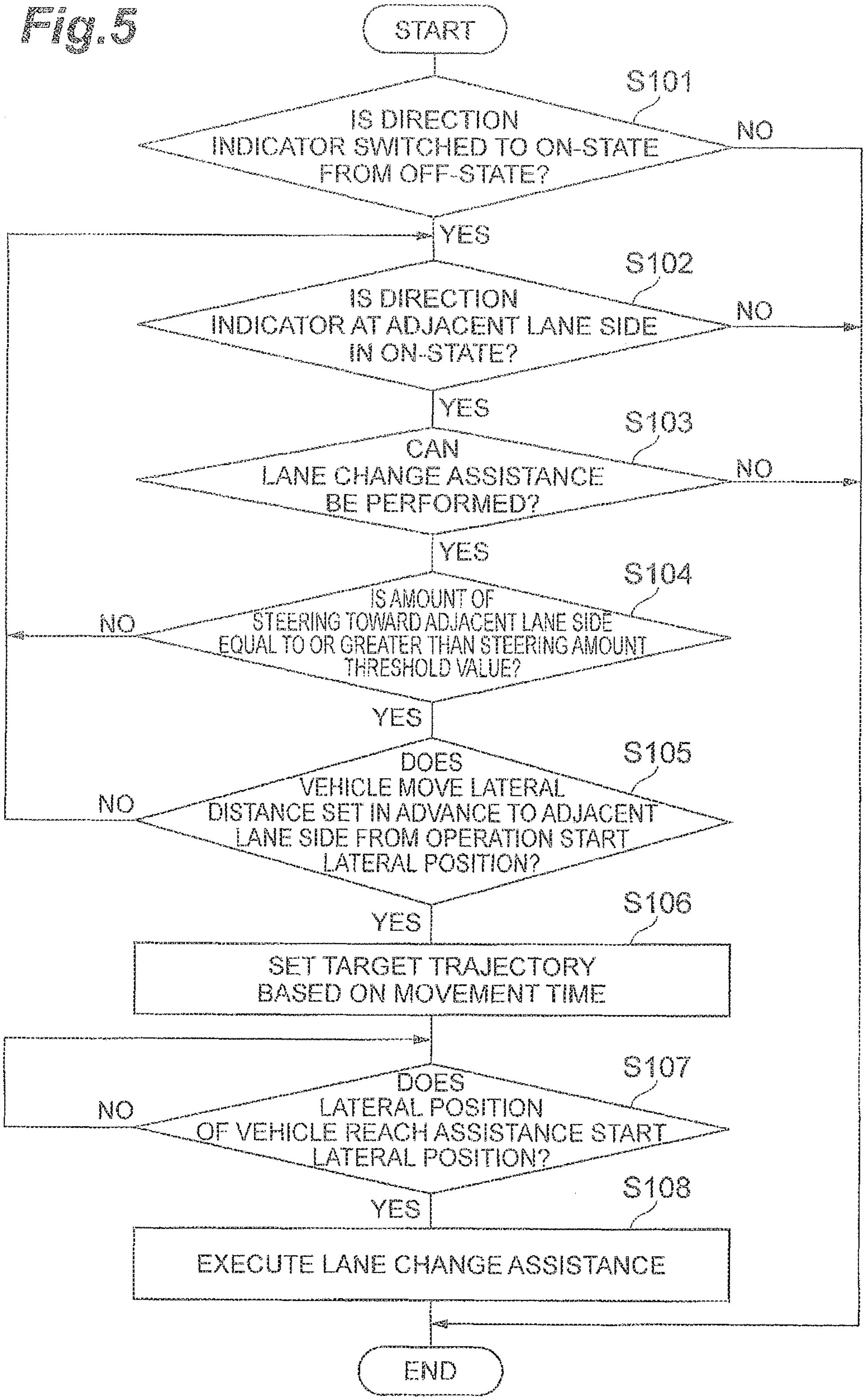
FIG. 5 is a flowchart illustrating a lane change assistance method in the drive assistance apparatus in the first embodiment.

Lane Change Assistance Method in the Drive Assistance Apparatus in the First Embodiment Next, a lane change assistance method in the drive assistance apparatus 100 in the first embodiment will be described. FIG. 5 is a flowchart illustrating the lane change assistance method in the drive assistance apparatus 100 in the first embodiment. Processes in the flowchart illustrated in FIG. 5 are repeatedly executed at each of times (for example, at each of times according to the internal frequency in the ECU 10) set in advance, for example, while the vehicle M travels.

As illustrated in FIG. 5, the direction indicator state recognition unit 13 in the ECU 10 in the drive assistance apparatus 100 determines whether or not the direction indicator of the vehicle M is switched to an ON-state from an OFF-state in STEP S101. The direction indicator state recognition unit 13 determines whether or not the direction indicator of the vehicle M is switched to an ON-state from an OFF-state based on the direction indicator information from the direction indicator sensor. In a case where it is determined that the direction indicator of the vehicle M has not been switched to an ON-state from an OFF-state (NO in S101), the ECU 10 ends the current processing, and executes STEP S101 again after elapse of a time set in advance. In a case where it is determined that the direction indicator of the vehicle M has been switched to an ON-state from an OFF-state (YES in S101), the process in the ECU 10 proceeds to STEP S102.

In STEP S102, the direction indicator state recognition unit 13 in the ECU 10 determines whether or not the direction indicator at the adjacent lane R2 side is in an ON-state. The direction indicator state recognition unit 13 recognizes the adjacent lane R2 using a known image analysis method based on, for example, the image information from the camera in the external sensor 1. In a case where it is determined that direction indicator at the adjacent lane R2 side has not been switched to an ON-state (NO in S102), the ECU 10 ends the current processing and executes STEP S101 again after elapse of a time set in advance. In a case where it is determined that the direction indicator at the adjacent lane R2 side is in an ON-state (YES in S102), the process in the ECU 10 proceeds to STEP S103.

In STEP S103, the assistance determination unit 14 in the ECU 10 determines whether or not the lane change assistance can be performed. The assistance determination unit 14 determines whether or not the lane change assistance can be performed by recognizing the obstacles surrounding the vehicle M based on, for example, the obstacle information from the radar or the LIDER in the external sensor 1. In a case where it is determined that the lane change assistance cannot be performed (NO in S103), the ECU 10 ends the current processing and executes STEP S101 again after elapse of a time set in advance. In a case where it is determined that the lane change assistance can be performed (YES in S103), the process in the ECU 10 proceeds to STEP S104.

In STEP S104, the steering amount determination unit 15 in the ECU 10 determines whether or not the amount of steering to the adjacent lane R2 side is equal to or greater than the steering amount threshold value. The steering amount determination unit 15 determines whether or not the amount of steering to the adjacent lane R2 side is equal to or greater than the steering amount threshold value based on the steering information from the steering sensor in the internal sensor 3. In a case where it is determined that the amount of steering to the adjacent lane R2 side is not equal to or greater than the steering amount threshold value (NO in S104), the process in the ECU 10 returns to STEP S102 again and repeats the processing. In a case where it is determined that the amount of steering to the adjacent lane R2 side is equal to or greater than the steering amount threshold value (YES in S104), the process in the ECU 10 proceeds to STEP S105. When the amount of steering toward the adjacent lane R2 side is equal to or greater than the steering amount threshold value, the lateral position of the vehicle M is the operation start lateral position W0.

In STEP S105, the movement time measuring unit 16 in the ECU 10 determines whether or not the vehicle M of which the direction indicator at the adjacent lane R2 side is continued to be in ON-state has moved the lateral distance H to the adjacent lane R2 side from the operation start lateral position W0. The movement time measuring unit 16 determines whether or not the vehicle M has moved the lateral distance H to the adjacent lane R2 side based on, for example, the image information from the camera in the external sensor 1. In a case where it is determined that the vehicle M has not moved the lateral distance H to the adjacent lane R2 side from the operation start lateral position W0 (NO in S105), the process in the ECU 10 returns to STEP S102 again and repeats the processing. In a case where it is determined that the vehicle M has moved the lateral distance H to the adjacent lane R2 side from the operation start lateral position W0 (YES in S105), the process in the ECU 10 proceeds to STEP S106. The movement time measuring unit 16 measures the time taken from the determination of the steering amount threshold value by the steering amount determination unit 15 to the determination of whether or not the vehicle M has moved the lateral distance H to the adjacent lane R2 side as the movement time.

In STEP S106, the target trajectory setting unit 17 in the ECU 10 performs the setting of the target trajectory. The target trajectory setting unit 17 sets the target trajectory based on the movement time measured by the movement time measuring unit 16. The target trajectory setting unit 17 sets a target trajectory which is shorter in length when the movement time becomes shorter. Alternatively, in a case where the movement time is shorter than the movement time threshold value set in advance, the target trajectory setting unit 17 may set a target trajectory which is shorter in length compared a case where the movement time is equal to or longer than the movement time threshold value set in advance. In addition, the target trajectory setting unit 17 may set the target vehicle speed pattern of the vehicle M along the target trajectory based on the movement time. The process in the ECU 10 proceeds to STEP S107.

In STEP S107, the assistance start determination unit 18 in the ECU 10 determines whether or not the lateral position of the vehicle M of which the direction indicator at the adjacent lane R2 side is in an ON-state has reached the assistance start lateral position P. The assistance start determination unit 18 determines whether or not the lateral position of the vehicle M has reached the assistance start lateral position P based on, for example, the image information from the camera in the external sensor 1. In a case where it is determined that the lateral position of the vehicle M has not reached the assistance start lateral position P (NO in S107), the process in the ECU 10 repeats the processing in STEP S107. In a case where the driver recognizes that the direction indicator at the adjacent lane R2 side is switched from an ON-state to an OFF-state and when it is not determined to be YES even thought the determination in S107 is repeated predetermined times, the ECU 10 ends the current processing and executes STEP S101 again after elapse of a time set in advance. In a case where it is determined that the lateral position of the vehicle M has reached the assistance start lateral position P (YES in S107), then, the process in ECU 10 proceeds to STEP S108.

In STEP S108, the lane change assistance unit 19 in the ECU 10 executes the lane change assistance. The lane change assistance unit 19 executes the lane change assistance for causing the vehicle M to change lane along the target trajectory (and the target vehicle speed pattern) set by the target trajectory setting unit 17 by transmitting a control signal to the actuator 6. In a case where the lane change assistance is finished, the ECU 10 switches the direction indicator at the adjacent lane R2 side from an ON-state to an OFF-state and repeats the processing in STEP S101 again.

The lane change assistance method in the drive assistance apparatus 100 in the first embodiment is described as above. However, the lane change assistance method is not limited to the method described above. For example, the ECU 10 may define the lateral position of the vehicle M at the time when the direction indicator at the adjacent lane R2 side is switched from an OFF-state to an ON-state in STEP S101 to be the operation start lateral position W0. In this case, STEP S104 can be omitted.

In addition, the ECU 10 does not necessarily perform the determination in STEP S103 of whether or not the lane change assistance can be performed. Even during the lane change assistance, the drive assistance apparatus 100 may hold or stop the lane change assistance in a case where another vehicle travelling on the adjacent lane R2 approaches the vehicle M. In addition, the ECU 10 may define the lateral position of the vehicle M (the position separated from the operation start lateral position W0 to the adjacent lane R2 side by the lateral distance H) at the time of finishing measuring of the movement time to be the assistance start lateral position P. In this case, STEP S107 can be omitted.

In a case where the distance from the operation start lateral position W0 to the assistance start lateral position P is shorter than the lateral distance H, and in a case where the direction indicator at the adjacent lane R2 side is switched to an ON-state in a state in which the vehicle M goes beyond the assistance start lateral position P and is located at the adjacent lane R2 side, the ECU 10 may not measure the movement time and may execute the lane change assistance in the related art (the lane change assistance in which the length of the target trajectory is constant).

Operational Effects of the Drive Assistance Apparatus in the First Embodiment

According to the drive assistance apparatus 100 in the first embodiment described above, in a case where the driver has an intention of a rapid lane change over a short distance, the movement time for moving the lateral distance H set in advance from the operation start lateral position W0 by the driver is considered to be short. Therefore, the target trajectory is set to be shorter in length when the movement time becomes shorter. Alternatively, in a case where the movement time is shorter than the movement time threshold value, the drive assistance apparatus 100 sets a target trajectory which is shorter in length compared to that in a case where the movement time is equal to or longer than the movement time threshold value. Therefore, according to the drive assistance apparatus 100, it is possible to execute the lane change assistance for causing the vehicle to change lane along the target trajectory in line with the steering feeling of the driver in contrast to case where the length of the target trajectory is constant regardless of the movement time. Therefore, it is possible to reduce the uncomfortable feeling for the driver in the lane change assistance.

In addition, the drive assistance apparatus 100 may define the position in the travelling lane R1 separated from the operation start lateral position W0 to the adjacent lane R2 side by the lateral distance H to be the assistance start lateral position P. In this case, since the lateral position of the vehicle M (measurement finishing lateral position W1) at the time of finishing the measuring of the movement time becomes the assistance start lateral position P, the drive assistance apparatus 100 can avoid the lateral position of the vehicle M reaching the assistance start lateral position P before measuring the movement time. Therefore, it is possible to set the target trajectory in line with the steering feeling of the driver based on the movement time.

Second Embodiment

Next, a drive assistance apparatus 200 in a second embodiment will be described. The drive assistance apparatus 200 is different from that in the first embodiment in a point that the target trajectory is set based on a lateral speed of the vehicle M at the time of reaching the assistance start lateral position P, not based on the movement time. The same signs will be given to configurations the same as or corresponding to those in the first embodiment, and descriptions thereof will not be repeated.

The drive assistance apparatus 200 in the second embodiment sets the target trajectory in the lane change assistance based on the lateral speed of the vehicle M at the time when the lateral position of the vehicle M of which the direction indicator at the adjacent lane R2 side is in an ON-state reaches the assistance start lateral position P. The lateral speed is, for example, a speed of the vehicle M in the width direction of the travelling lane R1. The speed of the vehicle M in the vehicle width direction of the vehicle M may be used as the lateral speed.

The lateral speed can be considered to vary according to the driver's intended rapidity of changing lane. That is, it can be considered that the lateral speed of the vehicle M at the assistance start lateral position P becomes high for the driver having an intention to change lane over a short distance in a short time, and the lateral speed becomes low for the driver having an intention to slowly change lane over a long distance. For this reason, the drive assistance apparatus 200 executes the lane change assistance in line with the intention of the driver by setting the target trajectories having different length based on the lateral speed of the vehicle M at the assistance start lateral position P.

The drive assistance apparatus 200 sets a target trajectory which is shorter in length when the lateral speed of the vehicle M becomes higher. Alternatively, in a case where the lateral speed of the vehicle M is equal to or higher than a lateral speed threshold value set in advance, the drive assistance apparatus 200 sets a target trajectory which is shorter in length compared to that in a case where the lateral speed is lower than the lateral speed threshold value. The lateral speed threshold value is a threshold value used for setting the target trajectory in line with the intention of the driver. The lateral speed threshold value may be a fixed value or may be a value that varies.

Configuration of the Drive Assistance Apparatus in the Second Embodiment

Figure 6:
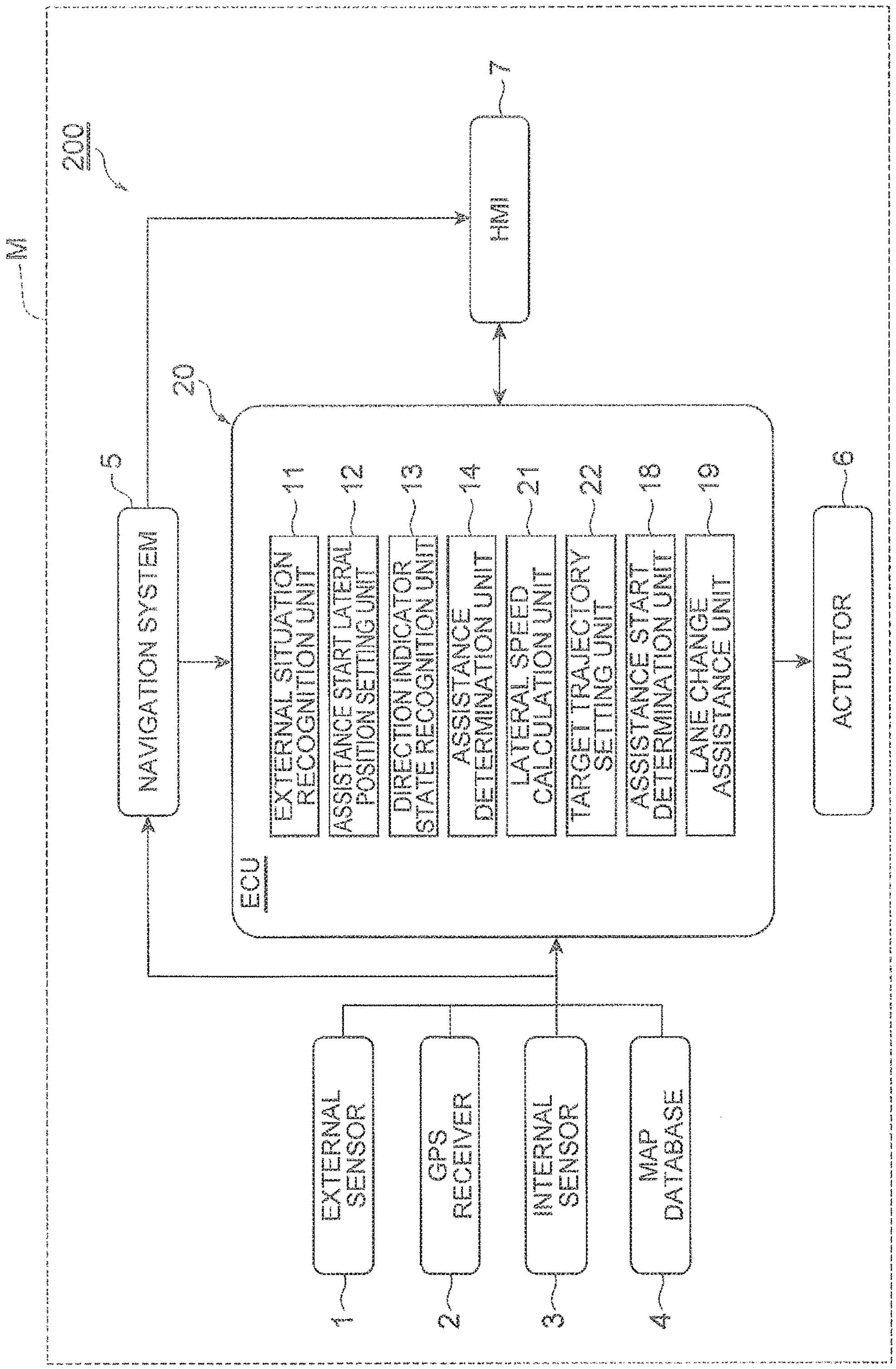
FIG. 6 is a block diagram illustrating a drive assistance apparatus in a second embodiment.

Hereinafter, a configuration of the drive assistance apparatus 200 in the second embodiment will be described with reference to FIG. 6. FIG. 6 is a block diagram illustrating the drive assistance apparatus 200 in the second embodiment. As illustrated in FIG. 6, the ECU 20 in the drive assistance apparatus 200 includes a lateral speed calculation unit 21 instead of the movement time measuring unit 16 in the first embodiment. In addition, the ECU 20 includes a target trajectory setting unit 22 instead of the target trajectory setting unit 17 in the first embodiment.

The lateral speed calculation unit 21 calculates the lateral speed of the vehicle M based on, for example, the results of detection by the external sensor 1 and the results of detection by the internal sensor 3. The lateral speed calculation unit 21 recognizes the moving direction of the vehicle M with respect to the travelling lane R1 based on, for example, the image information from the camera in the external sensor 1. The lateral speed calculation unit 21 calculates the speed (lateral speed) of the vehicle M in the width direction of the travelling lane R1 using the recognized moving direction of the vehicle M based on the vehicle speed information from the vehicle speed sensor in the internal sensor 3. The lateral speed calculation unit 21 may calculate the lateral speed using another known method.

The target trajectory setting unit 22 sets the target trajectory based on the lateral speed calculated by the lateral speed calculation unit 21. The target trajectory setting unit 22 sets target trajectories which are different from each other in length according to the lateral speed. The target trajectory setting unit 22, for example, sets a target trajectory which is shorter in length when the lateral speed becomes higher. The target trajectory setting unit 22, for example, sets a target trajectory of which the end point is closer to the current position of the vehicle M when the lateral speed becomes higher. The target trajectory setting unit 22 may set a target trajectory while allowing a sharper change of the trajectory (an amount of change of a control target value of the steering) when the lateral speed becomes higher. The target trajectory setting unit 17 may generate a target trajectory that becomes the base using a known method and modify the length of the base target trajectory according to the lateral speed, and then, may perform the setting of the target trajectory based on the lateral speed.

The target trajectory setting unit 22 may set target trajectories which are different from each other in length in a step wise manner based on the lateral speed calculated by the lateral speed calculation unit 21 (refer to FIG. 2). For example, in a case where the lateral speed is lower than the lateral speed threshold value set in advance, the target trajectory setting unit 22 sets a target trajectory which is shorter in length compared to that in a case where the lateral speed is equal to or higher than the lateral speed threshold value. The lateral speed threshold value is a threshold value used for setting the target trajectory in line with the intention of the driver. The lateral speed threshold value is not limited to one value. The lateral speed threshold value may be a fixed value or may be a value that varies. The target trajectory setting unit 22 sets target trajectories of lengths which are different from each other according to, for example, a comparison result between the lateral speed and the lateral speed threshold value. The target trajectory setting unit 22 may generate a plurality of target trajectories which are different from each other in length with the assistance start lateral position P as a start point, and may set one target trajectory among the plurality of target trajectories based on the comparison result between the lateral speed and the lateral speed threshold value. A known method can be adopted as the specific method of setting the target trajectory.

In addition, the target trajectory setting unit 22 may set a target vehicle speed pattern of the vehicle M according to the target trajectory. The target trajectory setting unit 22 sets the target vehicle speed pattern from, for example, the current vehicle speed of the vehicle M within a range which does not give an uncomfortable feeling for the driver. The target trajectory setting unit 22 sets the target vehicle speed pattern such that, for example, the vehicle speed at the end point of the target trajectory becomes the vehicle speed set in advance. The target trajectory setting unit 22 may set the target vehicle speed pattern based on the lateral speed. The target trajectory setting unit 22 sets the target vehicle speed pattern that finishes the lane change within a shorter time while allowing a sharper change of the speed (acceleration or deceleration) and a higher upper limit of the speed when the lateral speed becomes higher.

Figure 7:
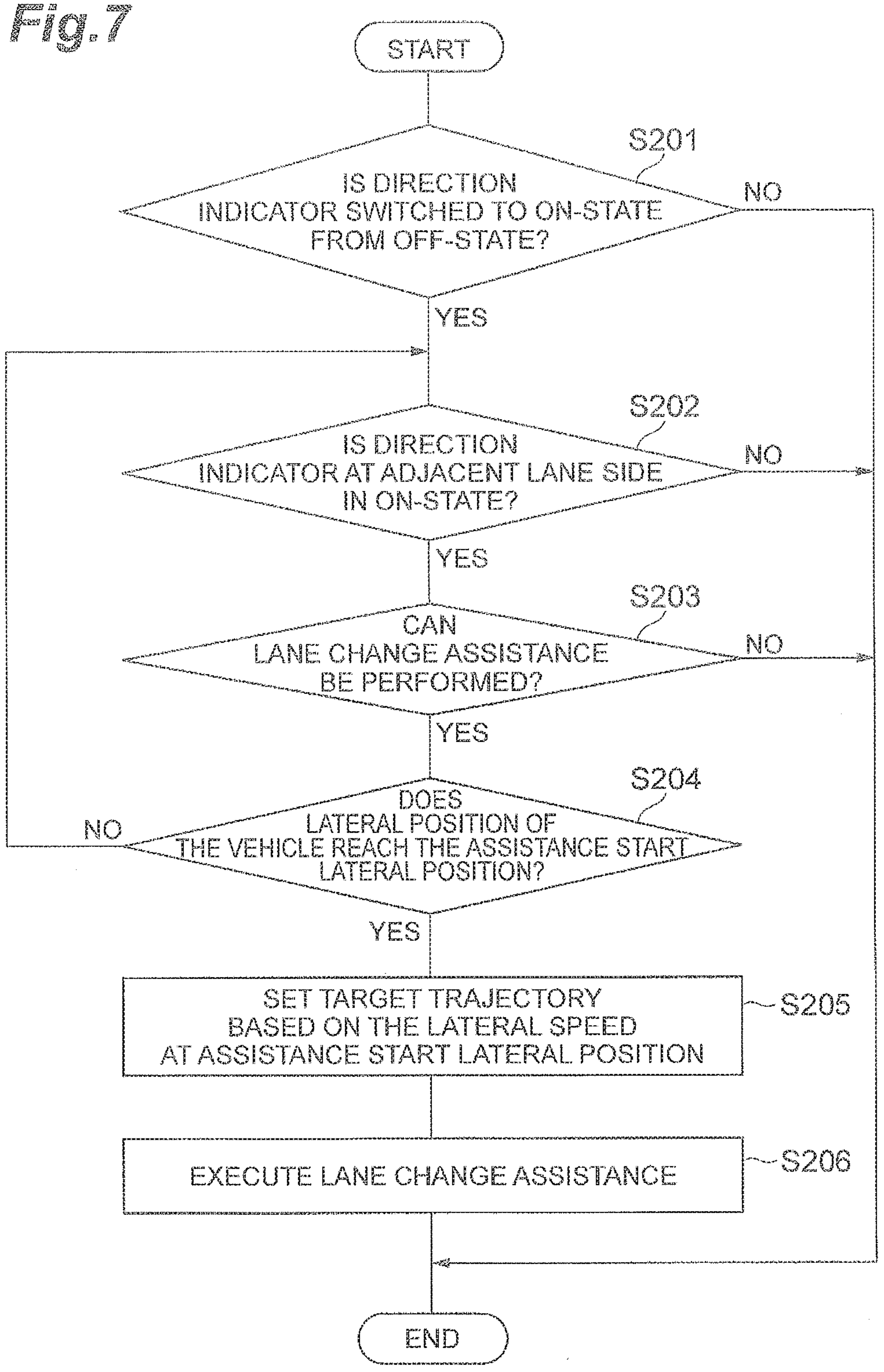
FIG. 7 is a flowchart illustrating a lane change assistance method in the drive assistance apparatus in the second embodiment.

Lane Change Assistance Method in the Drive Assistance Apparatus in the Second Embodiment Next, a lane change assistance method in the drive assistance apparatus 200 in the second embodiment will be described with reference to FIG. 7. FIG. 7 is a flowchart illustrating the lane change assistance method in the drive assistance apparatus 200 in the second embodiment. Processes in the flowchart illustrated in FIG. 7 are repeatedly executed at each of times (for example, at each of times according to the internal frequency in the ECU 20) set in advance, for example, while the vehicle M travels.

Processing tasks in STEP S201 to STEP S203 illustrated in FIG. 7 are the same as those in STEP S101 to STEP S103 illustrated in FIG. 5 in the first embodiment, and thus, descriptions thereof will not be repeated. As illustrated in FIG. 7, in a case where YES is determined in STEP S203, the process in the ECU 20 in the drive assistance apparatus 200 proceeds to STEP S204.

In STEP S204, the assistance start determination unit 18 in the ECU 20 determines whether or not the lateral position of the vehicle M of which the direction indicator at the adjacent lane R2 side is in an ON-state has reached the assistance start lateral position P. In a case where it is determined that the lateral position of the vehicle M has not reached the assistance start lateral position P (NO in S204), the process in the ECU 20 returns to STEP S202 again and repeats the processing. In a case where it is determined that the lateral position of the vehicle M has reached the assistance start lateral position P (YES in S204), the process in the ECU 20 proceeds to STEP S205.

In STEP S205, the target trajectory setting unit 22 in the ECU 20 performs the setting of the target trajectory. The target trajectory setting unit 22 sets the target trajectory based on the lateral speed calculated by the lateral speed calculation unit 21. The target trajectory setting unit 22 sets, for example, a target trajectory which is shorter in length when the lateral speed becomes higher. Alternatively, in a case where the lateral speed is lower than the lateral speed threshold value set in advance, the target trajectory setting unit 22 sets a target trajectory which is shorter in length compared to that in a case where the lateral speed is equal to or higher than the lateral speed threshold value. In addition, the target trajectory setting unit 22 may set the target vehicle speed pattern of the vehicle M along the target trajectory based on the lateral speed. In a case where the target trajectory is set, the process in the ECU 20 proceeds to STEP S206.

In STEP S206, the lane change assistance unit 19 in the ECU 20 executes the lane change assistance. The lane change assistance unit 19 executes the lane change assistance for causing the vehicle M to change lane along the target trajectory (and the target vehicle speed pattern) set by the target trajectory setting unit 17 by transmitting a control signal to the actuator 6.

The lane change assistance method in the drive assistance apparatus 200 in the second embodiment is described as above. However, the lane change assistance method is not limited to the method described above. For example, the determination in STEP S203 of whether or not the lane change assistance can be performed is not necessarily performed. Even during the lane change assistance, in a case where another vehicle travelling in the adjacent lane R2 approaches the vehicle M or the like, the drive assistance apparatus 200 may hold or stop the lane change assistance.

Operational Effects of the Drive Assistance Apparatus in the Second Embodiment

According to the drive assistance apparatus 200 in the second embodiment described above, in a case where the driver has an intention of a rapid lane change over a short distance, the lateral speed of the vehicle M at the time of reaching the assistance start lateral position P is considered to be high. Therefore, the target trajectory is set to be shorter in length when the lateral speed becomes higher. Alternatively, in a case where the lateral speed is higher than the lateral speed threshold value, the drive assistance apparatus 200 sets a target trajectory which is shorter in length compared to that in a case where the lateral speed is lower than the lateral speed threshold value. Therefore, according to the drive assistance apparatus 200, it is possible to execute the lane change assistance for causing the vehicle to change lane along the target trajectory in line with the steering feeling of the driver in contrast to a case where the length of the target trajectory is constant regardless of the lateral speed. Therefore, it is possible to reduce the uncomfortable feeling for the driver in the lane change assistance.

Third Embodiment

Reference Aspect

Figure 8:
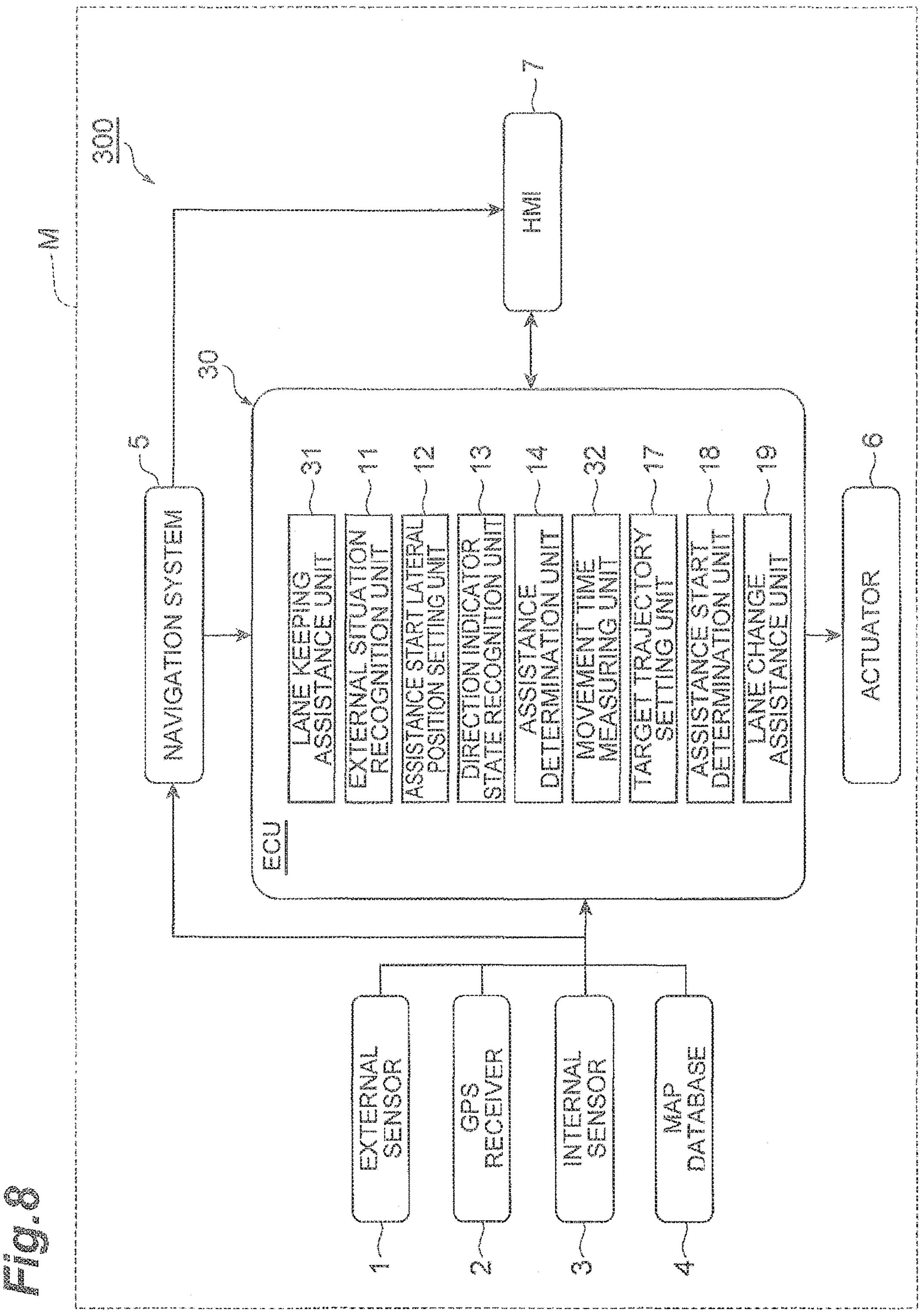
FIG. 8 is a block diagram illustrating a drive assistance apparatus in a third embodiment.

Subsequently, a drive assistance apparatus 300 in a third embodiment will be described. FIG. 8 is a block diagram illustrating a drive assistance apparatus 300 in the third embodiment. The drive assistance apparatus 300 illustrated in FIG. 8 is different from that in the first embodiment in a point that the target lateral position in the lane keeping assistance is a start position for measuring the movement time. That is, in the third embodiment, it is assumed that the vehicle M executes the lane keeping assistance. The same signs will be given to configurations the same as or corresponding to those in the first embodiment, and descriptions thereof will not be repeated.

The drive assistance apparatus 300 sets the target trajectory in the lane change assistance based on the movement time which is a time taken for the vehicle M of which the direction indicator at the adjacent lane R2 side is in an ON-state to move a lateral distance H set in advance from the target lateral position G in the lane keeping assistance to the adjacent lane R2 side. The target lateral position G in the lane keeping assistance is set, for example, at the middle position Rc in the travelling lane R1. The target lateral position G may be set at a position shifted to the right or left from the middle position Rc in the travelling lane R1.

Figure 9:
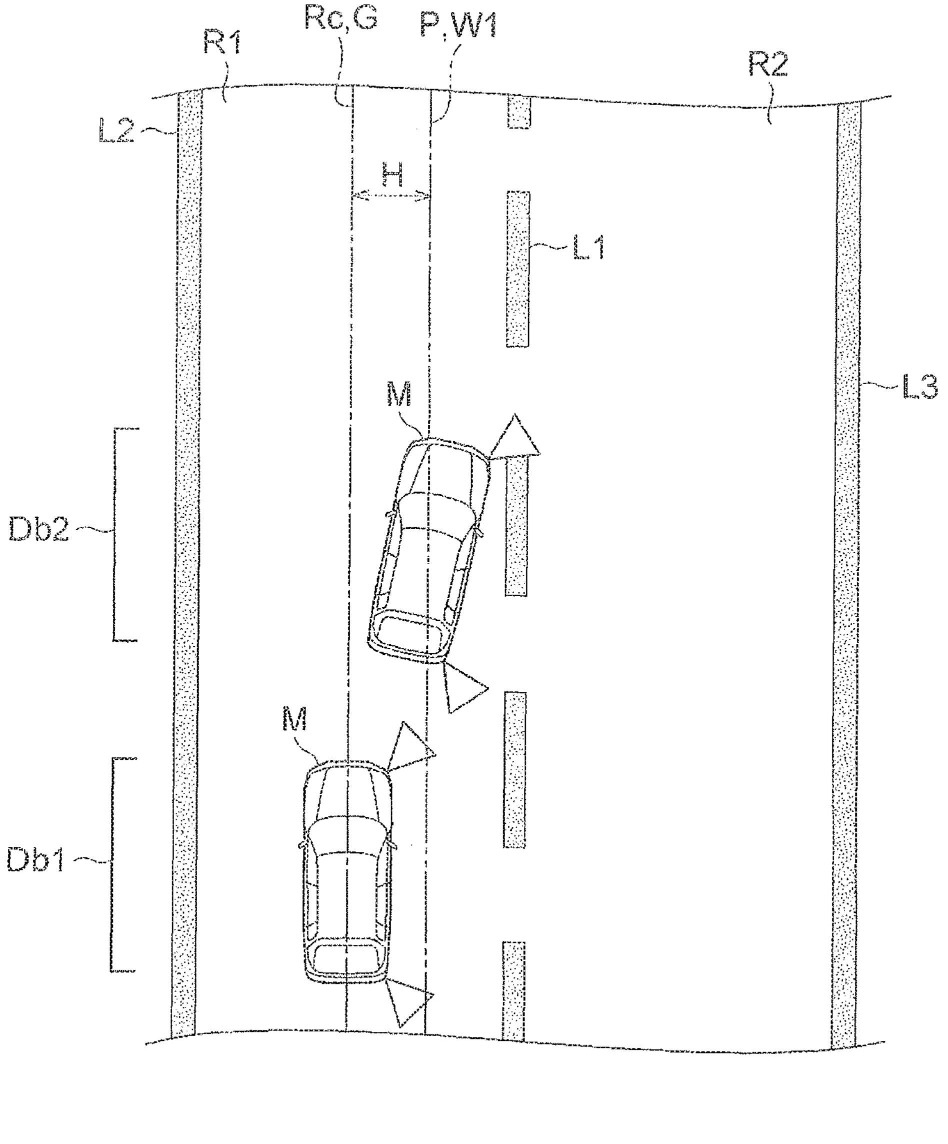
FIG. 9 is a plan view for describing measuring a movement time in the third embodiment.

FIG. 9 is a plan view for describing measuring the movement time in the third embodiment. In FIG. 9, the target lateral position G in the lane keeping assistance coincides with the middle position Rc in the travelling lane R1. In this case, the measurement finishing lateral position W1 where the measuring of the movement time finishes is a position in the travelling lane R1 separated from the middle position Rc (target lateral position G) to the adjacent lane R2 side by the lateral distance H. In addition, in FIG. 9, the measurement finishing lateral position W1 is the assistance start lateral position P1.

In addition, Db1 and Db2 in FIG. 9 illustrate a trend of the situations before the time when the lateral position of the vehicle M reaches the assistance start lateral position P and the lane change assistance is started. Db1 illustrates a situation in which the direction indicator at the adjacent lane R2 side is switched to an ON-state from an OFF-state by the driver of the vehicle M in which the target lateral position G is maintained by the lane keeping assistance. Db2 illustrates a situation in which the lateral position of the vehicle M of which the direction indicator at the adjacent lane R2 side is continued to be in ON-state reaches the assistance start lateral position P.

The drive assistance apparatus 300 measures the movement time which is a time taken for the vehicle M of which the direction indicator at the adjacent lane R2 side is in an ON-state to move the lateral distance H set in advance from the target lateral position G in the lane keeping assistance to the adjacent lane R2 side. The drive assistance apparatus 300 sets a target trajectory which is shorter in length when the movement time of the vehicle M becomes longer. Alternatively, in a case where the movement time of the vehicle M is shorter than the movement time threshold value set in advance, the drive assistance apparatus 300 sets a target trajectory which is shorter in length compared to that in a case where the movement time is equal to or longer than the movement time threshold value.

Configuration of the Drive Assistance Apparatus in the Third Embodiment

Hereinafter, a configuration of the drive assistance apparatus 300 in the third embodiment will be described. As illustrated in FIG. 8, an ECU 30 in the drive assistance apparatus 300 includes a lane keeping assistance unit 31. In addition, the ECU 30 includes a movement time measuring unit 32 instead of the movement time measuring unit 16 in the first embodiment.

The lane keeping assistance unit 31 executes the lane keeping assistance of the vehicle M. The lane keeping assistance unit 31 recognizes the lateral position of the vehicle M using the positional relationship between the lane lines L1 and L2 of the travelling lane R1 and the vehicle M based on, for example, the image information from the camera in the external sensor 1. The lane keeping assistance unit 31 controls the vehicle M such that the lateral position of the vehicle M is kept to be the target lateral position G set in the travelling lane R1 in advance by transmitting a control signal to a steering actuator in the actuator 6. Even when the lane keeping assistance is executed, in a case where a driving operation by the driver is input, the driving operation is reflected in the travelling of the vehicle. The lane keeping assistance unit 31, for example, may execute the lane keeping assistance using a known method.

The movement time measuring unit 32 measures the movement time which is a time taken for the vehicle M of which the direction indicator at the adjacent lane R2 side is continued to be in ON-state to move the lateral distance H set in advance from the target lateral position G to the adjacent lane R2 side due to the operation of the driver. Firstly, the movement time measuring unit 32 determines whether or not the vehicle M has moved the lateral distance H from the target lateral position G to the adjacent lane R2 side using the positional relationship between the lane lines L1 and L2 of the travelling lane R1 and the vehicle M based on, for example, the image information from the camera in the external sensor 1. In a case where it is determined that the vehicle M has moved the lateral distance H from the target lateral position G to the adjacent lane R2 side, the movement time measuring unit 32 measures the movement time. In a case where the direction indicator at the adjacent lane R2 side is not in an ON-state, the movement time measuring unit 32 may not perform the measuring of the movement time.

The assistance start lateral position setting unit 12 in the third embodiment may set a position in the travelling lane R1 separated from the target lateral position G in the lane keeping assistance to the adjacent lane R2 side by the lateral distance H as the assistance start lateral position P.

Figure 10:
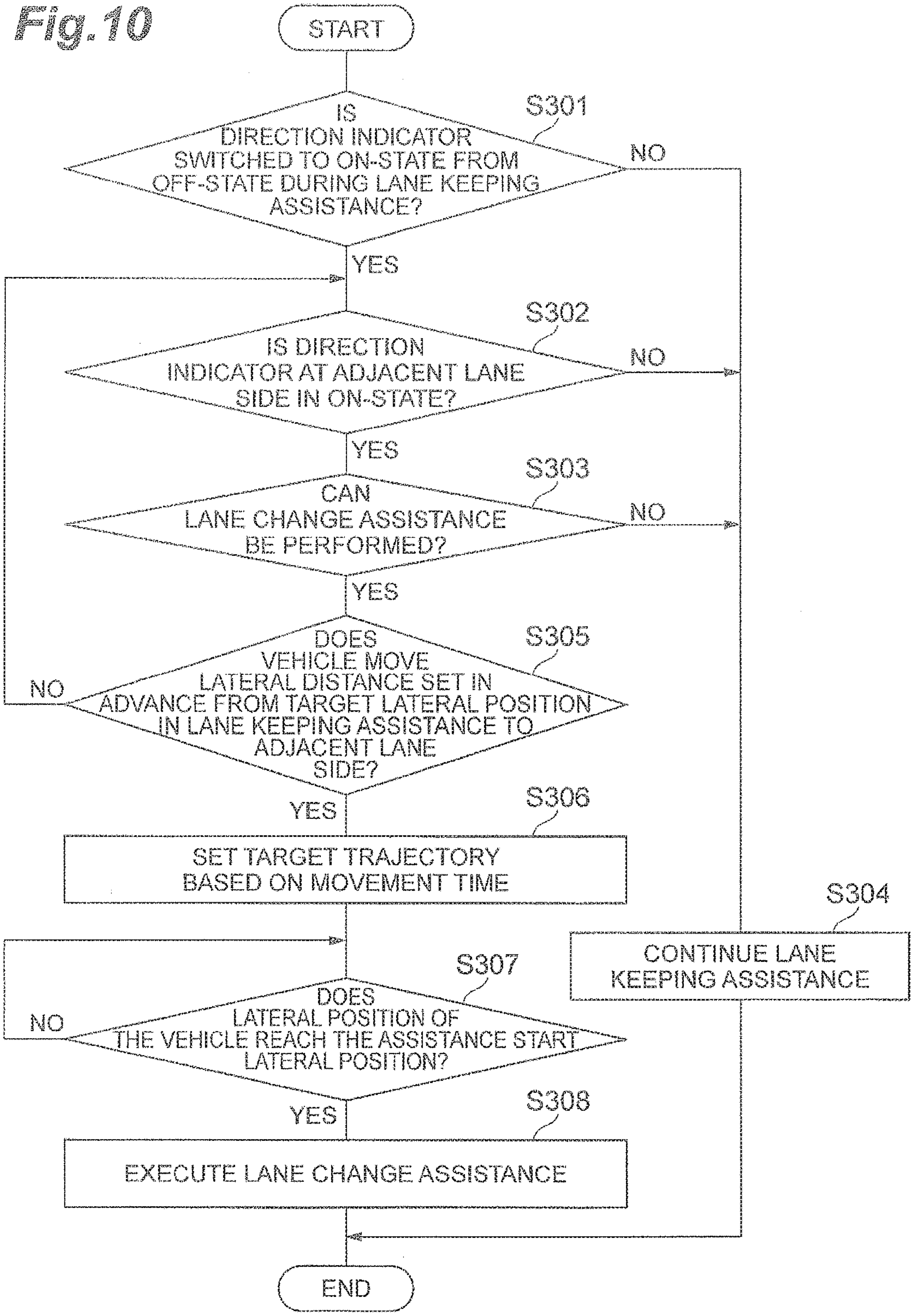
FIG. 10 is a flowchart illustrating a lane change assistance method in the drive assistance apparatus in the third embodiment.

Lane Change Assistance Method in the Drive Assistance Apparatus in the Third Embodiment Next, a lane change assistance method in the drive assistance apparatus 300 in the third embodiment will be described. FIG. 10 is a flowchart illustrating the lane change assistance method in the drive assistance apparatus 300 in the third embodiment. Processes in the flowchart illustrated in FIG. 10 are repeatedly executed at each of times (for example, at each of times according to the internal frequency in the ECU 30) set in advance, for example, while the lane keeping assistance is executed on the vehicle M.

Processing tasks in STEP S301 to STEP S303 illustrated in FIG. 10 are the same as those in STEP S101 to STEP S103 illustrated in FIG. 5 in the first embodiment, and thus, descriptions thereof will not be repeated. In a case where NO is determined in STEP S301, in a case where NO is determined in STEP S302, and in a case where NO is determined in STEP S303, the process in the ECU 30 in the third embodiment proceeds to STEP 304. This is a point different from that in the first embodiment.

As illustrated in FIG. 10, in STEP S304, the lane keeping assistance unit 31 in the ECU 30 in the drive assistance apparatus 300 continues to perform the lane keeping assistance. The lane keeping assistance unit 31 continues the currently executed lane keeping assistance based on the image information from the camera in the external sensor 1. The ECU 30 ends the current lane change assistance while the lane keeping assistance is continued. Then, the ECU 30 executes STEP S301 again after elapse of a time set in advance.

In a case where YES is determined in STEP S303, the process in the ECU 30 proceeds to STEP S305. In STEP S305, the movement time measuring unit 32 in the ECU 30 determines whether or not the vehicle M has moved the lateral distance H from the target lateral position G in the lane keeping assistance to the adjacent lane R2 side. In a case where the vehicle M has not moved the lateral distance H from the target lateral position G to the adjacent lane R2 side (NO in S305), the process in the ECU 30 returns to STEP S302 and repeats the processing. In a case where the vehicle M has moved the lateral distance H from the target lateral position G to the adjacent lane R2 side (YES in S305), the process in the ECU 30 proceeds to STEP S306. The movement time measuring unit 32 measures a time taken for the vehicle M of which the direction indicator is continued to be in ON-state to move the lateral distance H from target lateral position G to the adjacent lane R2 side as the movement time.

In STEP S306, the target trajectory setting unit 17 in the ECU 30 performs the setting of the target trajectory. The target trajectory setting unit 17 sets the target trajectory based on the movement time measured by the movement time measuring unit 32. The target trajectory setting unit 17, for example, sets a target trajectory which is shorter in length when the movement time becomes shorter. Alternatively, in a case where the movement time is shorter than the movement time threshold value set in advance, the target trajectory setting unit 17 sets a target trajectory which is shorter in length compared to that in a case where the movement time is equal to or longer than the movement time threshold value. In addition, the target trajectory setting unit 17 may set the target vehicle speed pattern of the vehicle M along the target trajectory based on the movement time. In a case where the target trajectory is set, the process in the ECU 30 proceeds to STEP S307.

The processing tasks in STEP S307 and STEP S308 are respectively the same as those in STEP S107 and STEP S108 illustrated in FIG. 5 in the first embodiment, and thus, description thereof will not be repeated.

In a case where the lane change assistance in STEP S308 finishes, the ECU 30 switches the direction indicator at the adjacent lane R2 side from an ON-state to an OFF-state and repeats the processing tasks from STEP S301 again. In a case where the lane change assistance finishes, the ECU 30 may execute the lane keeping assistance in the adjacent lane R2.

The lane change assistance method in the drive assistance apparatus 300 in the third embodiment is described as above. However, the lane change assistance method is not limited to the method described above. For example, the ECU 30 does not necessarily need to perform the determination in STEP S303 whether or not the lane change assistance can be performed. Even during the lane change assistance, in a case where another vehicle travelling in the adjacent lane R2 approaches the vehicle M or the like, the drive assistance apparatus 300 may hold or stop the lane change assistance. In addition, the ECU 30 may define the lateral position of the vehicle M (the position separated from the target lateral position G to the adjacent lane R2 side by the lateral distance H) at the time of finishing measuring the movement time to be the assistance start lateral position P. In this case, STEP S307 can be omitted.

Operational Effects of the Drive Assistance Apparatus in the Third Embodiment

According to the drive assistance apparatus 300 in the third embodiment described above, in a case where the driver has an intention of a rapid lane change over a short distance, the movement time for moving the lateral distance H set in advance from the target lateral position G by the driver is considered to be short. Therefore, the target trajectory is set to be shorter in length when the movement time becomes shorter. Alternatively, in a case where the movement time is shorter than the movement time threshold value, the drive assistance apparatus 300 sets a target trajectory which is shorter in length compared to that in a case where the movement time is equal to or longer than the movement time threshold value. Therefore, according to the drive assistance apparatus 300, it is possible to execute the lane change assistance for causing the vehicle to change lane along the target trajectory in line with the steering feeling of the driver in contrast to a case where the length of the target trajectory is constant regardless of the movement time. Therefore, it is possible to reduce the uncomfortable feeling for the driver in the lane change assistance.

In addition, the drive assistance apparatus 300 may define the position in the travelling lane R1 separated from the target lateral position G in the lane keeping assistance to the adjacent lane R2 side by the lateral distance H to be the assistance start lateral position P. In this case, since the lateral position of the vehicle M at the time of finishing the measuring of the movement time becomes the assistance start lateral position P, the drive assistance apparatus 300 can avoid the lateral position of the vehicle M reaching the assistance start lateral position P before measuring the movement time. Therefore, it is possible to set the target trajectory in line with the steering feeling of the driver based on the movement time.

As above, the embodiments of the present invention are described. However, the present invention is not limited to the embodiments described above. The present invention, including the embodiments described above, can be embodied in various forms of modifications and improvements based on knowledge of those skilled in the art. For example, a target trajectory having an appropriate length may be set based on both the movement time in the first embodiment and the third embodiment and the lateral speed in the second embodiment. In addition, the lane keeping assistance may also be executed in the first embodiment and in the second embodiment, and the drive assistance apparatuses 100 and 200 may include the lane keeping assistance unit 31 in the third embodiment.

What is claimed is:

1. A drive assistance apparatus configured to perform lane change assistance for changing lane to an adjacent lane from a travelling lane by controlling a vehicle, the apparatus comprising:

an electronic control unit (ECU) programmed to:

set a target trajectory in the lane change assistance based on a lateral position of the vehicle at a time when a direction indicator at the adjacent lane side is in an ON-state, and a movement time taken for the vehicle of which the direction indicator is continued to be in ON-state to move a lateral distance set in advance to the adjacent lane side from an operation start lateral position which is a lateral position of the vehicle when an amount of steering by a driver of the vehicle toward the adjacent lane side is equal to or greater than a steering amount threshold value in a state in which the direction indicator at the adjacent lane side is in an ON-state; and execute the lane change assistance for causing the vehicle to change lane along the target trajectory in a case where the lateral position of the vehicle of which the direction indicator is continued to be in ON-state reaches the assistance start lateral position set in advance in the travelling lane from the setting of the target trajectory, wherein the ECU is configured to set the target trajectory which is shorter in length when the movement time becomes shorter, or wherein, in a case where the movement time is shorter than a movement time threshold value, the ECU is configured to set the target trajectory which is shorter in length compared to that in a case where the movement time is equal to or longer than the movement time threshold value.

2. The drive assistance apparatus according to claim 1, wherein a position in the travelling lane separated from the operation start lateral position to the adjacent lane side by the lateral distance is set to be the assistance start lateral position.

3. A drive assistance apparatus configured to perform lane change assistance for changing lane toward an adjacent lane from a travelling lane by controlling a vehicle, the apparatus comprising:

an electronic control unit (ECU) programmed to:

set a target trajectory in the lane change assistance based on a lateral speed of the vehicle at a time when the lateral position of the vehicle of which a direction indicator at the adjacent lane side is in an ON-state reaches an assistance start lateral position set in the travelling lane in advance; and execute the lane change assistance for causing the vehicle to change lane along the target trajectory in a case where the ECU sets the target trajectory, wherein the ECU is configured to set the target trajectory which is shorter in length when the lateral speed becomes higher, or wherein, in a case where the lateral speed is equal to higher than a lateral speed threshold value, the ECU is configured to set the target trajectory which is shorter in length compared to that in a case where the lateral speed is lower than the lateral speed threshold value.

* * * * *